(12) United States Patent
McKenna et al.

(10) Patent No.: US 8,821,619 B2
(45) Date of Patent: Sep. 2, 2014

(54) ADSORBENT CARTRIDGE ASSEMBLY WITH END CAP

(75) Inventors: Douglas B. McKenna, Avondale, PA (US); J. Anthony DelNegro, Wilmington, DE (US); Nicholas J. Dunlop, Wilmington, DE (US)

(73) Assignee: Micropore, Inc., Elkton, MD (US)

( * ) Notice: Subject to any disclaimer, the term of this patent is extended or adjusted under 35 U.S.C. 154(b) by 96 days.

(21) Appl. No.: 13/273,854

(22) Filed: Oct. 14, 2011

(65) Prior Publication Data

US 2012/0090470 A1   Apr. 19, 2012

Related U.S. Application Data

(60) Provisional application No. 61/393,273, filed on Oct. 14, 2010.

(51) Int. Cl.
*B01D 53/02*   (2006.01)

(52) U.S. Cl.
USPC ............... 96/147; 96/117.5; 96/139; 55/498

(58) Field of Classification Search
USPC .................... 55/498; 96/117.5, 139, 147
See application file for complete search history.

(56) References Cited

U.S. PATENT DOCUMENTS

| | | |
|---|---|---|
| 2,038,071 A | 11/1932 | Wilhelm |
| 2,395,842 A | 3/1946 | Borgstrom |
| 2,629,652 A | 2/1953 | Schechter et al. |
| 2,812,769 A | 11/1957 | Schaefer et al. |
| 2,837,413 A | 6/1958 | Hay |
| 3,034,655 A | 5/1962 | York |
| 3,489,144 A | 1/1970 | Dibelius et al. |
| 3,604,416 A | 9/1971 | Petrahai et al. |
| 3,607,040 A | 9/1971 | Hervert et al. |
| 3,755,535 A | 8/1973 | Naber |
| 3,847,837 A | 11/1974 | Boryta |
| 3,860,818 A | 1/1975 | Stalder et al. |
| 3,909,206 A | 9/1975 | Katz |
| 3,950,157 A | 4/1976 | Matney |
| 4,153,661 A | 5/1979 | Ree et al. |
| 4,168,706 A | 9/1979 | Lovell |
| 4,234,326 A | 11/1980 | Bailey et al. |
| 4,250,172 A | 2/1981 | Mutzenberg et al. |
| 4,255,175 A | 3/1981 | Wilkins |
| 4,342,278 A | 8/1982 | Horan |
| 4,342,811 A | 8/1982 | Lopatin et al. |
| 4,407,723 A | 10/1983 | MacGregor et al. |

(Continued)

FOREIGN PATENT DOCUMENTS

| | | |
|---|---|---|
| EP | 0171551 | 2/1986 |
| WO | WO0107114 | 2/2001 |

(Continued)

OTHER PUBLICATIONS

Battelle (Battelle News Release:Naval Sea Systems Command Issues Submarines Life-Saving Lithium Hydroxide Curtains Developed by Battelle) Apr. 6, 2004 http://www.battelle.org/news/04/4-6-04LithCurtain.stm, 2 pgs.

(Continued)

*Primary Examiner* — Christopher P Jones
(74) *Attorney, Agent, or Firm* — Fish & Richardson P.C.

(57) ABSTRACT

This invention relates to an adsorbent cartridge assembly having at least one end cap, and systems related thereto, for removing gaseous contaminants from the air or other gases.

38 Claims, 20 Drawing Sheets

(56) References Cited

U.S. PATENT DOCUMENTS

| | | |
|---|---|---|
| 4,409,978 A | 10/1983 | Bartos |
| 4,442,162 A | 4/1984 | Kuester |
| 4,493,718 A | 1/1985 | Schweizer |
| 4,508,700 A | 4/1985 | Hoshiko |
| 4,553,983 A | 11/1985 | Baker |
| 4,559,066 A | 12/1985 | Hunter et al. |
| 4,631,872 A | 12/1986 | Daroga |
| 4,642,996 A | 2/1987 | Harris et al. |
| 4,665,050 A | 5/1987 | Degen et al. |
| 4,707,953 A | 11/1987 | Anderson et al. |
| 4,781,184 A | 11/1988 | Fife |
| 4,985,296 A | 1/1991 | Mortimer, Jr. et al. |
| 5,082,471 A | 1/1992 | Athayde et al. |
| 5,165,399 A | 11/1992 | Hochberg |
| 5,332,426 A | 7/1994 | Tang et al. |
| 5,338,516 A | 8/1994 | Zhang et al. |
| 5,449,014 A | 9/1995 | Yan-ho |
| 5,665,148 A | 9/1997 | Mühlfeld et al. |
| 5,742,516 A | 4/1998 | Olcerst |
| 5,879,423 A | 3/1999 | Luka et al. |
| 5,964,221 A | 10/1999 | McKenna |
| 6,176,897 B1 | 1/2001 | Keefer |
| 6,192,633 B1 | 2/2001 | Hilbert |
| 6,247,471 B1 | 6/2001 | Bower et al. |
| 6,349,508 B1 | 2/2002 | Ju et al. |
| 6,385,919 B1 | 5/2002 | McCarthy |
| 6,428,680 B1 | 8/2002 | Kreichauf |
| 6,565,627 B1 | 5/2003 | Golden et al. |
| 6,699,309 B1 | 3/2004 | Worthington, II et al. |
| 6,797,043 B2 | 9/2004 | Nalette et al. |
| 6,862,529 B2 | 3/2005 | Brown et al. |
| 6,893,483 B2 | 5/2005 | Golden et al. |
| 7,077,891 B2 | 7/2006 | Jaffe et al. |
| 7,109,853 B1 | 9/2006 | Mattson et al. |
| 7,196,023 B2 | 3/2007 | Langley et al. |
| 7,282,464 B2 | 10/2007 | Kimmel |
| 7,326,280 B2 | 2/2008 | Hrycak et al. |
| 7,329,307 B2 | 2/2008 | Hrycak et al. |
| 7,395,936 B2 | 7/2008 | Knight |
| 7,402,199 B2 | 7/2008 | Maru |
| 7,407,533 B2 | 8/2008 | Steins |
| 7,470,311 B2 | 12/2008 | Sueoka et al. |
| 7,481,234 B1 | 1/2009 | Gustafson et al. |
| 7,959,720 B2 | 6/2011 | Deckman et al. |
| 8,413,655 B2 | 4/2013 | McKenna et al. |
| 2001/0012494 A1 | 8/2001 | Kreichauf |
| 2001/0053667 A1 | 12/2001 | Kreichauf |
| 2002/0124490 A1 | 9/2002 | McCarthy |
| 2002/0134246 A1 | 9/2002 | Babicki et al. |
| 2002/0170436 A1 | 11/2002 | Keefer et al. |
| 2003/0011948 A1 | 1/2003 | Saito et al. |
| 2003/0205131 A1 | 11/2003 | Golden et al. |
| 2005/0145224 A1 | 7/2005 | Zulauf et al. |
| 2005/0160912 A1 | 7/2005 | Hrycak et al. |
| 2005/0160913 A1 | 7/2005 | Hrycak et al. |
| 2006/0042467 A1 | 3/2006 | Maru |
| 2006/0048648 A1 | 3/2006 | Gibbs et al. |
| 2006/0096458 A1 | 5/2006 | Abdolhosseini et al. |
| 2006/0137522 A1 | 6/2006 | Nishimura et al. |
| 2006/0150811 A1 | 7/2006 | Callahan et al. |
| 2006/0162704 A1 | 7/2006 | Hagler et al. |
| 2006/0169142 A1 | 8/2006 | Rode et al. |
| 2007/0200420 A1 | 8/2007 | McCormick |
| 2007/0253872 A1 | 11/2007 | Keefer et al. |
| 2008/0148936 A1 | 6/2008 | Baksh |
| 2008/0282887 A1 | 11/2008 | Chance et al. |
| 2009/0293720 A1 | 12/2009 | Liu |
| 2009/0301493 A1 | 12/2009 | McKenna et al. |
| 2011/0206572 A1 | 8/2011 | McKenna et al. |
| 2013/0276634 A1 | 10/2013 | McKenna et al. |

FOREIGN PATENT DOCUMENTS

| | | |
|---|---|---|
| WO | WO2005086613 | 9/2005 |
| WO | WO2006025853 | 3/2006 |
| WO | WO2007117266 | 10/2007 |
| WO | WO2009152264 | 12/2009 |
| WO | WO 2010/129082 | 11/2010 |
| WO | WO2011094296 | 8/2011 |
| WO | WO2012051524 | 4/2012 |

OTHER PUBLICATIONS

Daley, Tom "A New Approach to Non-Regenerative CO2 Removal", Submarine Air Monitoring and Air Purification Conference (SAMAP), San Diego, CA (Oct. 21, 2009), 25 pgs.

Davis, et al, "The Dependence of the CO2 Removal Efficiency of LiOH on Humidity and Mesh Size", presented by the American Society of Mechanical Engineers, at the Intersociety Conference on Environmental Systems, San Diego, California, Jul. 10-13, 1978, 7 pgs.

Davis, et al, "The Factors Influencing the Formation of Li2o3 from LiOH and CO2", presented by the American Society of Mechanical Engineers, at the Intersociety Environmental Systems Conference, San Diego, California, Jul. 14-17, 1980, 6 pgs.

General Specification NASA-JSC, Requirements for Lithium Hydroxide Used for CO2 Removal in Closed Environments, National Aeronautics and Space Administration, Houston, Texas, Oct. 1994, 30 pgs.

"Lithium Hydroxide, Anhydrous", pamphlet CAS No. 1310-65-2, FMC Corporation, copyright 2001, 2 pgs.

Military Specification for Lithium Hydroxide (LiOH), Technical, MIL-L-20213E, Naval Sea Systems Command, Jun. 18, 1980, 12 pgs.

The American Heritage Dictionary of the English Language: Fourth Edition 2000, 2 pgs.

Wang, "Residence Time and Carbon Dioxide Scrubbing Efficiency in Life Support Systems", Aviation Space and Environmental Medicine, Feb. 1981, pp. 104-108.

Webster's Third New International Dictionary, unabridged, 1993, downloaded from the Internet on Nov. 19, 2009, http://lionreference.chadwyck.com/searchFulltext.do?id=31052187&idType=offset&divLevel=2 . . . , 1 pg.

Examiner's First Report dated Oct. 10, 2007 for Australian Appln. No. 2005280633, 2 pgs.

International Preliminary Report on Patentability and Written Opinion dated Jul. 31, 2006 for International Appln. No. PCT/US2005/003480, 8 pgs.

International Preliminary Report on Patentability and Written Opinion dated Jul. 8, 2008 for International Appln. No. PCT/US2006/031847, 6 pgs.

International Preliminary Report on Patentability and Written Opinion dated Dec. 13, 2010 for International Appln. No. PCT/US2009/046939, 9 pgs.

International Search Report dated Feb. 1, 2006 for International Appln. No. PCT/US2005/003480, 3 pgs.

International Search Report dated Apr. 30, 2008 for International Appln. No. PCT/US2006/031847, 3 pgs.

International Search Report dated Aug. 12, 2009 for International Appln. No. PCT/US2009/046939, 1 pg.

International Search Report and Written Opinion dated Mar. 29, 2011 for International Appln. No. PCT/US11/22556, 7 pgs.

International Search Report and Written Opinion dated Feb. 16, 2012 for International Appln. No. PCT/US2011/056345, 12 pgs.

Extended European Search Report in EP Application No. EP 11737564.2, dated Jul. 16, 2013, 6 pages.

Supplementary European Search Report in EP Application No. EP 11737564.2, dated Aug. 2, 2013, 7 pages.

International Preliminary Report on Patentability in International Application No. PCT/US2011/022556, dated Jul. 31, 2012, 7 pages.

International Preliminary Report on Patentability in International Application No. PCT/US2011/056345, dated Apr. 16, 2013, 10 pages.

International Search Report and Written Opinion in International Application No. PCT/US2013/037776, dated Sep. 13, 2013, 10 pages.

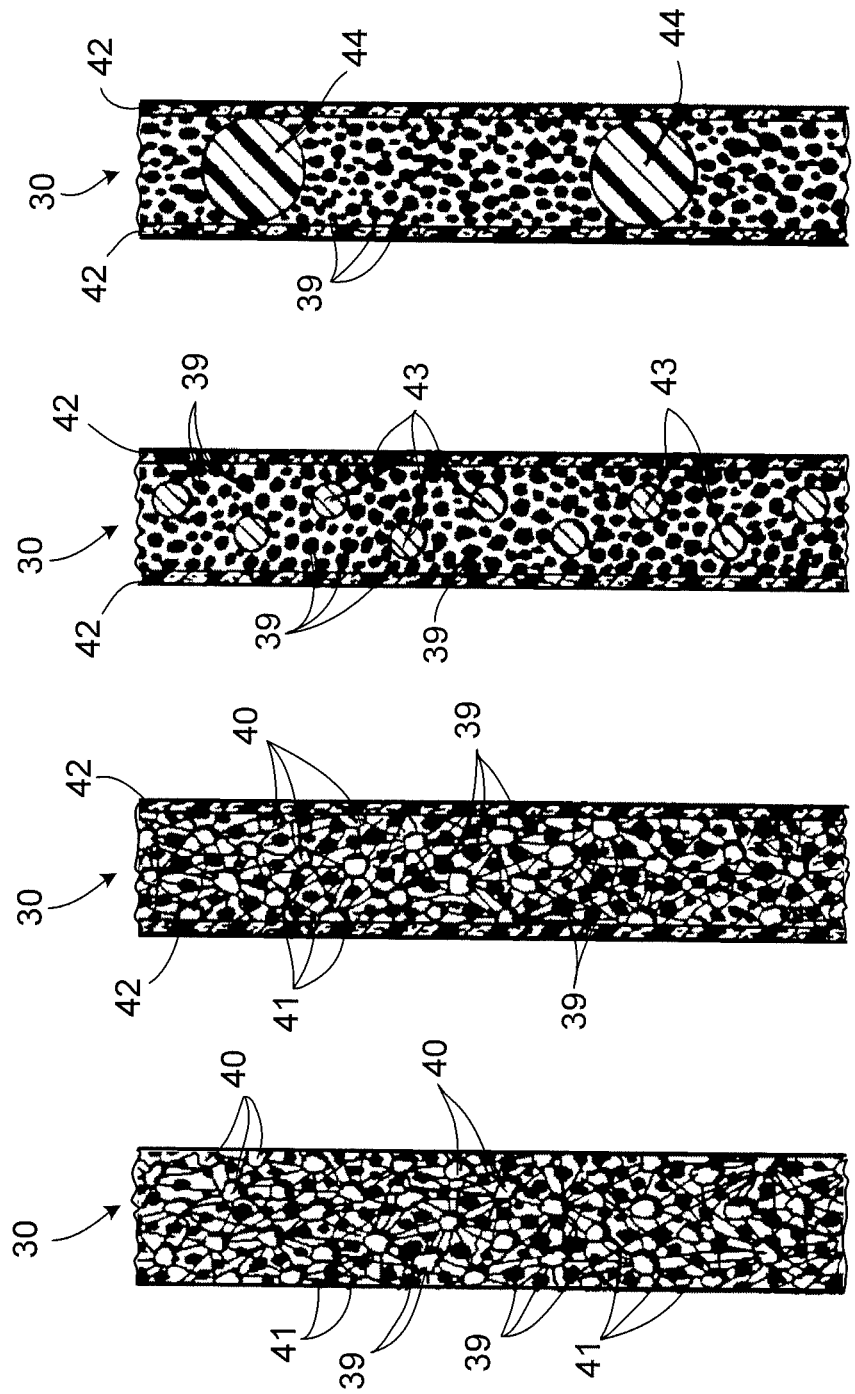

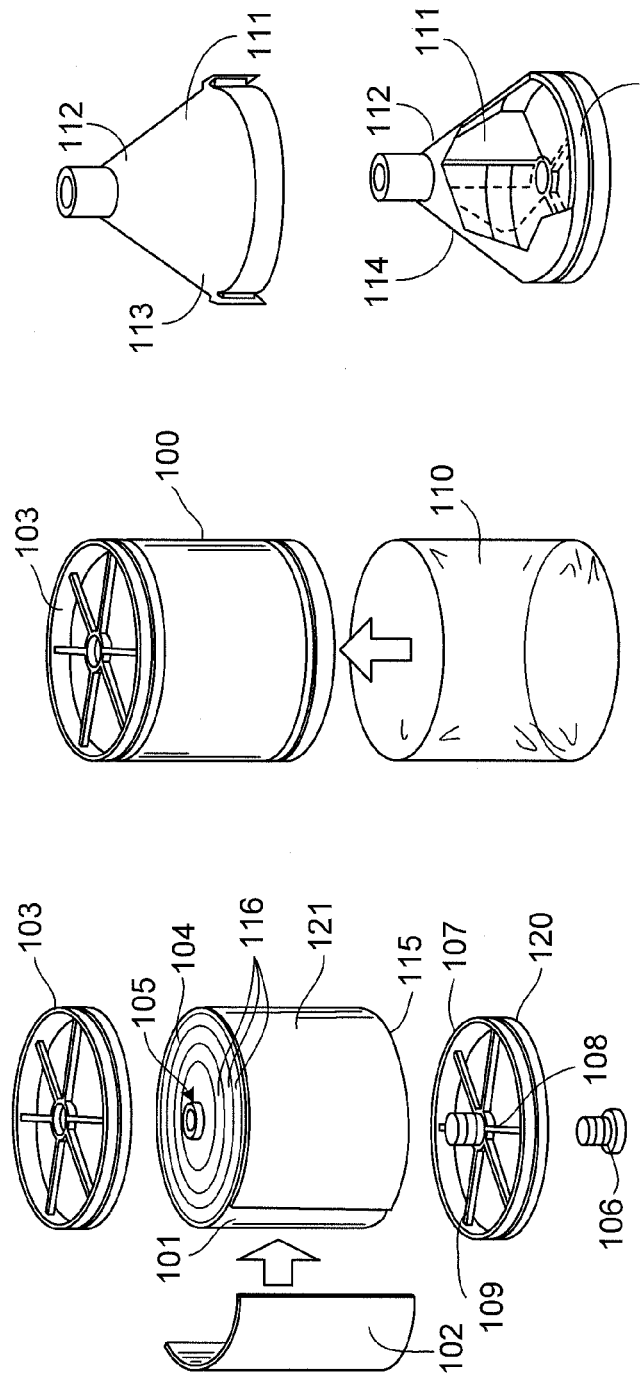

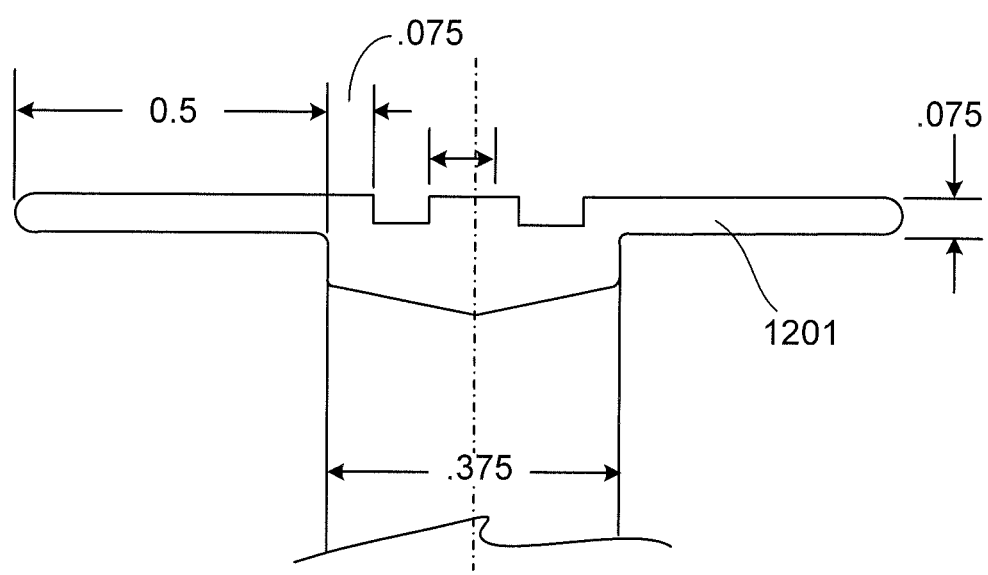
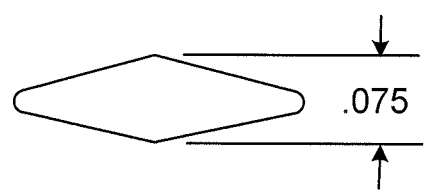
FIG. 13

ADSORBENT CARTRIDGE ASSEMBLY WITH END CAP

This application claims the benefit of priority of U.S. Provisional Appl. 61/393,273, filed Oct. 14, 2010, which is incorporated herein by reference in its entirety.

TECHNICAL FIELD

This invention relates to an adsorbent cartridge assembly having at least one end cap, and systems related thereto, for removing gaseous contaminants from the air or other gases.

BACKGROUND

A carbon dioxide removal system maintains carbon dioxide ($CO_2$) concentration at a safe level. Maintaining $CO_2$ at safe levels can be accomplished by passing exhaled or inhaled gases through a canister filled with a chemical adsorbent, such as soda lime or anhydrous lithium hydroxide (LiOH). Several manufacturers make these adsorbents and use their own special mixes. For example, SODASORB®, manufactured by W. R. Grace & Co., is composed of a mixture of sodium hydroxide, calcium hydroxide, and potassium hydroxide.

Adsorbents are typically in the form of small granules that are generally sized between 0.04 to 0.25 inches (1.0 to 6.5 mm; 1 to 18 mesh) in diameter. The granules may be poured directly into a canister for scrubbing $CO_2$. The gas to be scrubbed is forced through the granules either by lung power or by fan supplied power. Due to the generation of airborne caustic dust, the handling or pouring of granules in confined spaces is an undesirable operation.

Pre-filled granular cartridges offer the ease of use characteristics over loose granules, but these pre-filled canisters still have issues with shipping and handling or in-use shock and vibration, which causes chemical dusting of the adsorbent, settling of adsorbent which changes pressure drop, channeling of gases around the adsorbent (along the outer wall), all of which result in variable adsorbent performance. Pre-filled cartridges are installed into a canister/outer housing for use within equipment for scrubbing of $CO_2$.

An alternative to granular adsorbent is the ExtendAir® adsorbent cartridge (Micropore Inc.). This technology as generally described in U.S. Pat. No. 5,964,221 solves all of the aforementioned issues which granular adsorbents have, while also providing the ease of use characteristics desired.

For many applications, an ExtendAir® adsorbent sheet is wound on a cylindrical core, but is sometimes stacked to form a cube or other shapes. The adsorbent is prevented from unwinding or losing shape by using an inexpensive polymer film wrapped around the exterior of the cartridge. This cartridge has ease of handling advantages offered by the pre-filled granular canisters and reduces or eliminates dusting, without the added manufacturing cost and bulk, of a completely enclosing plastic or metal housing.

However, the ends of the adsorbent cartridge assembly may become damaged during shipping, handling or even in-use. Further, the size or shape of the cartridge may not allow use of the cartridge with canisters of different shapes or sizes than that of the cartridge. In addition, for certain applications, the adsorbent material of the cartridge may be incompatible with direct contact with the canister material. Finally, it is desirable to produce an assembly that enables a uniform end seal or perimeter seal surface, without blocking perimeter flow channels. In the case of a cylindrical adsorbent cartridge, the seal would have to accommodate the step in the spirally wound cartridge, resulting from the outermost layer of the adsorbent sheet material.

Hence, there is a need for improved adsorbent cartridges to meet these needs. This invention addresses these needs and others.

SUMMARY

The present invention provides, inter alia, an adsorbent cartridge assembly for removing gaseous contaminants, comprising:

(a) one or more adsorbent surfaces arranged in multiple layers with edges of the layers forming two open end faces of a three-dimensional cartridge, wherein the open end faces are at opposite ends of the cartridge; and wherein the layers are mechanically spaced to allow gas flow between the layers from one open end face of the cartridge to the other open end face of the cartridge;

(b) an end cap extending about and covering at least portions of an outer surface of the cartridge adjacent to one open end face of the cartridge.

In some embodiments, the end cap protrudes beyond the cartridge so as to extend beyond the outer portion of the cartridge in a direction of flow through the assembly, the end cap having an inner surface.

The present invention further provides an adsorbent cartridge assembly for removing gaseous contaminants, comprising:

(a) an adsorbent cartridge, comprising one or more adsorbent surfaces arranged in multiple layers, wherein said surfaces arranged in multiple layers comprise a first open end face, a second open end face, and an outer portion; wherein:

the open end faces are at opposite ends of the cartridge;

said layers are disposed orthogonally with respect to the open end faces; and said layers are mechanically spaced so as to allow gas flow between said layers; and (b) an end cap secured around said first open end face, comprising:

an outer sleeve circumscribing the outer portion of one end of the cartridge adjacent to said first open face; wherein said outer sleeve has a portion protruding beyond said one end of the cartridge; and the protruding portion comprises an inner surface.

In some embodiments, the end cap further comprises an inner sleeve inserted into the inner core of the roll; and a plurality of radial ribs arranged substantially equidistant from each other connecting the inner sleeve to the inner surface of the protruding portion of the outer sleeve.

In some embodiments, the end cap further comprises a sealing ring molded to the inner surface of the protruding portion of the outer sleeve, the sealing ring surrounding the entire inner circumference of the outer sleeve.

In some embodiments, the sealing ring is co-molded to the inner surface and is of a different material than the remainder of the end cap.

In some embodiments:

the cartridge comprises one adsorbent surface wound into a roll to form the multiple layers mechanically spaced by ribs disposed on the adsorbent surfaces; wherein the roll has an inner core, parallel to gas flow and perpendicular to the open end faces, said inner core being coaxial to the outer portion of the roll;

the end cap further comprises an inner sleeve inserted into the inner core of the roll; and a plurality of radial ribs arranged substantially equidistant from each other connecting the inner sleeve to the inner surface of the protruding portion of the outer sleeve;

wherein the end cap further comprises a sealing ring co-molded to the inner surface of the protruding portion of the outer sleeve, the sealing ring surrounding the entire inner circumference of the outer sleeve, wherein the sealing ring is of a different material than the remainder of the end cap.

This invention offers the advantages of providing a uniform end seal or perimeter seal surface, without blocking perimeter flow channels. The perimeter seal is possible with the end cap even though there is a step in the spirally wound cartridge. The sealing surface can be made more rigid than one might choose if sealing directly to the adsorbent cartridge surface, separating superior adsorbent material properties, from superior sealing material properties. The end cap can protect the ends of the adsorbent cartridge from damage during shipping, handling or even in-use. Further, use of an end cap which is chemically compatible with caustics with a cartridge that eliminates chemical dusting can allow for the canister to be made of materials that may not be compatible with the adsorbent chosen. The cartridge assembly allows full use of the adsorbent (flow through outer channels), while allowing the outlet of the cartridge assembly to be a different shape or size to that of the adsorbent cartridge (e.g., to convert from a 6 inch to 5 inch diameter, or vice versa; to convert from a cylindrical cartridge to a square outlet or inlet, or vice versa).

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1(*b*) is a cross-section top view of the adsorption canister of FIG. 1(*a*) where the sheets inside the canister have a spiral configuration.

FIG. 1(*c*) is an enlargement of the circular area of the cross-section shown in FIG. 1(*b*) showing the sheets separated by a separating means.

FIG. 1(*d*) is a cross-section view of an adsorption sheet of the present invention where the sheet is formed of expanded polytetrafluoroethylene with adsorbent particles encapsulated within.

FIG. 1(*e*) is a cross-section view of an adsorption sheet of the present invention where the sheet of FIG. 1(*d*) is surrounded by an outer membrane.

FIG. 1(*f*) is a cross-section view of an adsorption sheet of the present invention where adsorbent material is attached to an internal screen and outer membranes are attached to the adsorbent particles.

FIG. 1(*g*) is a cross-section view of an adsorption sheet of the present invention where outer membranes are attached to an internal screen and the interstices in the screen contain adsorbent material.

FIGS. 1(*h*) through 1(*k*) are three-quarter elevation views of a method for forming the sheet of FIG. 1(*g*).

FIG. 1(*l*) is a scanning electron micrograph (SEM), enlarged 5,000 times, of a cross section of an adsorbent sheet of the present invention were the adsorbent powder is formed into a microporous sheet by thermally induced phase separation of polyethylene.

FIG. 1(*m*) is a three-quarter top elevation view of an adsorbent sheet for use in the present invention, in which separating ribs have been molded on one side of the sheet out of the adsorbent itself.

FIG. 1(*n*) is a cross-section view of the adsorbent sheet shown in FIG. 1(*m*).

FIG. 1(*o*) is a three-quarter top elevation view of another embodiment of an adsorbent sheet for use in the present invention, in which separating ribs have been molded in an angular fashion on one side of the adsorbent sheet.

FIG. 1(*p*) is a three-quarter side elevation view of still another embodiment of an adsorbent sheet for use in the present invention, in which separating ribs have been molded in an angular fashion on both sides of the adsorbent sheet.

FIG. 1(*q*) is a detailed view of the adsorbent sheet illustrated in FIG. 1(*p*).

FIG. 2(*a*) is an embodiment of an adsorbent cartridge assembly with end caps.

FIG. 2(*b*) shows a plastic sleeve wrapped around an adsorbent cartridge assembly.

FIG. 2(*c*) shows a flow cone attached to an end cap.

FIG. 2(*d*) shows an embodiment of an end cap with two opposing core plugs arranged so that two or more cartridges can be stacked together using the end cap.

FIG. 3(*b*) shows a cross-sectional view of the cartridge assembly shown in FIG. 2(*a*).

FIG. 4(*b*) shows a detailed view of the mechanism through which the flow cone of FIG. 3(*a*) is attached onto the end cap.

FIG. 5(*b*) shows a detailed view of an end cap having a ledge around its inner protruding side.

FIG. 6(*b*) shows an end cap with a circumscribed groove on its outer sleeve.

FIG. 11-13 show another embodiment of the adsorbent cartridge assembly with an end cap and a flow cone.

Like reference symbols in the various drawings indicate like elements.

DETAILED DESCRIPTION

Figure 1A:
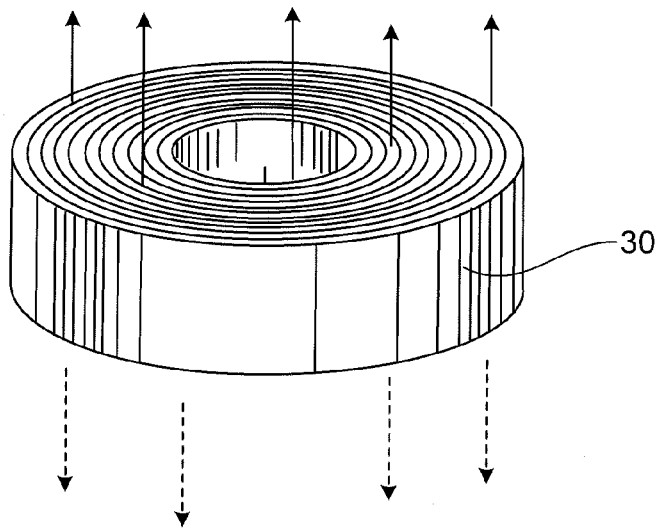
FIG. 1(*a*) is a three-quarter perspective view of an adsorption cartridge of the present invention where the cartridge is cylindrical and the sheets are spiral.

The present invention provides, inter alia, an adsorbent cartridge assembly that is designed to provide efficient adsorption, mechanical resistance to the adsorbent cartridge against shocks and vibrations, help reduce or eliminate air by-passing the cartridge, and prevent damages due to caustic reaction between the cartridge and inner walls of a canister. As the mechanism for removing gaseous contaminants from a gas is dependent on the particular material chosen, the use of the word "adsorption" in this specification is meant to include adsorption, absorption, chemisorption, physisorption, catalysis etc.

Accordingly, disclosed herein, inter alia, is an adsorbent cartridge assembly for removing gaseous contaminants, comprising:

(a) one or more adsorbent surfaces arranged in multiple layers with edges of the layers forming two open end faces of a three-dimensional cartridge, wherein the open end faces are at opposite ends of the cartridge; and wherein the layers are mechanically spaced to allow gas flow between the layers from one open end face of the cartridge to the other open end face of the cartridge;

(b) an end cap extending about and covering at least portions of an outer surface of the cartridge adjacent to one open end face of the cartridge.

In some embodiments, the end cap protrudes beyond the cartridge so as to extend beyond the outer portion of the cartridge in a direction of flow through the assembly, the end cap having an inner surface. In some embodiments, the outer surface of the end cap may be of larger dimensions than the outer surface of the cartridge. In some embodiments, the outer surface of the end cap may be of different shape than the outer surface of the cartridge.

In some embodiments, the present invention provides an adsorbent cartridge assembly comprising:

(a) an adsorbent cartridge, comprising one or more adsorbent surfaces arranged in multiple layers, wherein said surfaces arranged in multiple layers comprise a first open end face, a second open end face, and an outer portion; wherein:
the open end faces are at opposite ends of the cartridge;
said layers are disposed orthogonally with respect to the open end faces; and
said layers are mechanically spaced so as to allow gas flow between said layers; and (b) an end cap secured around said first open end face, comprising:
an outer sleeve circumscribing the outer portion of one end of the cartridge adjacent to said first open face; wherein said outer sleeve has a portion protruding beyond said one end of the cartridge; and the protruding portion comprises an inner surface.

In some embodiments, the outer sleeve further comprises one or more supporting members extending from the inner surface of the protruding portion of the outer sleeve and protruding at least partially over the first open end face.

In some embodiments, the one or more supporting members is a single member circumscribing the inner surface of the protruding portion of the outer sleeve.

In some embodiments:
the end cap further comprises an inner hub aligned over the center of said first open end face; and
the one or more supporting members comprise a plurality of radial ribs connecting the inner hub to the inner surface of the protruding portion of the outer sleeve.

In some embodiments, the plurality of radial ribs are arranged substantially equidistant from each other.

In some embodiments, the inner hub is a disc.

In some embodiments, the inner hub is a ring.

In some embodiments, the cartridge comprises one adsorbent surface wound into a roll to form the multiple layers; wherein said roll has an outer portion.

In some embodiments, the roll has an inner core, parallel to gas flow and perpendicular to the open end faces; wherein said inner core is coaxial to the outer portion of the roll.

In some embodiments, the inner core is solid.

In some embodiments, the inner core is hollow.

In some embodiments:
the end cap further comprises a hub centered over the inner core; and
the one or more supporting members comprise a plurality of radial ribs connecting the inner hub to the inner surface of the protruding portion of the outer sleeve.

In some embodiments:
the hub comprises a ring arranged concentrically to the outer sleeve; and
the one or more supporting members comprise a plurality of radial ribs connecting the inner ring to the inner surface of the protruding portion of the outer sleeve.

In some embodiments, the assembly further comprises a plug inserted into the ring.

In some embodiments, the assembly further comprises core plugs inserted into the ring in opposing directions so as to connect more than one cartridge in series.

In some embodiments:
the hub comprises a disc arranged concentrically to the outer sleeve; and
the one or more supporting members comprise a plurality of radial ribs connecting the inner ring to the inner surface of the protruding portion of the outer sleeve.

In some embodiments:
the inner core is hollow;
the inner hub comprises an inner sleeve inserted into the inner core; and
the one or more supporting members comprise a plurality of radial ribs connecting the inner sleeve to the inner surface of the protruding portion of the outer sleeve.

In some embodiments:
the inner core is hollow;
the inner hub comprises a plug inserted into the inner core; and
the one or more supporting members comprise a plurality of radial ribs connecting the plug to the inner surface of the protruding portion of the outer sleeve.

In some embodiments, the hub has substantially the same dimension as the inner core of the roll.

In some embodiments, the cartridge further comprises a foam or sealing material covering at least a portion of an outer layer of the roll.

In some embodiments, the cartridge further comprises a foam or sealing material inserted under an outer layer of the roll.

In some embodiments, the layers are spaced by ribs disposed on the adsorbent surfaces.

In some embodiments, the layers are spaced by separating screens between the adsorbent surfaces.

In some embodiments, the end cap is secured to said first open end face by any method chosen from the group of: ultrasonic welding, shrink-wrapping, adhesives, and molding.

In some embodiments, the end cap is secured to the first open end face by a shrink wrap covering the outer portion of the cartridge and at least a portion of the outer sleeve.

In some embodiments, the outer sleeve tapers in the direction of the protruding portion allowing the end cap to be secured to the cartridge without any external securer.

In some embodiments, the outer sleeve further comprises a groove circumscribing the outer portion of the outer sleeve.

In some embodiments, the end cap is secured to said first open end face by a shrink wrap covering the outer portion of said cartridge and extending into the groove.

In some embodiments, the assembly further comprises a cone secured around the outer sleeve, wherein said cone comprises an opening with a smaller diameter than the first open end face.

In some embodiments, the outer sleeve further comprises a groove circumscribing the inner surface of the protruding portion of the outer sleeve; and the cone further comprises a protrusion on an outer surface of the cone, which locks into the groove.

In some embodiments, the assembly further comprises a sealant disposed between the cone and the inner surface of the protruding portion of the outer sleeve.

In some embodiments, the sealant is an o-ring.

In some embodiments, the inner core is hollow; and wherein said assembly further comprises a dome secured around the outer sleeve.

In some embodiments, the end cap is made from materials capable of absorbing shocks and/or contains flexible material suitable for making sealing attachment of the end cap to the cartridge.

In some embodiments, the cartridge has more than one axially extended channel within its interior through which gas can flow.

In some embodiments, the end cap further comprises means to promote a uniform flow of air across a cross-sectional surface of the cartridge. In some embodiments, means is selected from the group of a flow deflector plate, a filter, a ring with sloping ribs and a disc.

In some embodiments, the assembly further comprises a second end cap secured around the second open end face, comprising:

an outer sleeve circumscribing the outer portion of an end of the cartridge adjacent to said second open face; wherein said outer sleeve has a portion protruding beyond the end of the cartridge adjacent to said second open face; and the protruding portion comprises an inner surface.

In some embodiments, the present invention provides a gaseous contaminant removal system, comprising:

(a) the assembly of any one of one of the aforementioned embodiments, or combination thereof; and
(b) a canister for housing said cartridge;
wherein:
said canister comprises an inlet through which gas can flow to contact the adsorbent cartridge; and an outlet for gas flow; wherein one of the open end faces of the cartridge is adjacent to the inlet.

In some embodiments, the second open end face is adjacent to the inlet.

In some embodiments, the assembly further comprises a sealant disposed between the inner wall of the canister and the protruding portion of the outer sleeve, so that air is directed into and does not by-pass the cartridge.

In some embodiments, the term "open end faces are at opposite ends of the cartridge" means one open end provides an inlet for gas flow and the other open end provides for outlet for gas flow through the cartridge. In some embodiments, the open end faces are parallel to each other at opposite ends of the cartridge. In some embodiments, the open end faces are not parallel to each other, wherein the cartridge has curvature.

In general, the adsorbent cartridges of the invention do not require a rigid outer housing. The adsorbent cartridge has the advantage of instead using a less expensive end cap to interconnect the cartridge to the inlet and/or outlet of the gas system (e.g., the canister). Preferably, this allows the end cap to interconnect the cartridge to the gas system (e.g., canister) without need of fastening to the inlet and/or outlet of the gas system (e.g., without need of adhesive or mechanical fasteners between the cartridge and the canister inlet or outlet).

The cartridge and end cap are described in more detail below.

Adsorbent Cartridge

The cartridges include, but are not limited to, ExtendAir® cartridges and those described in U.S. Pat. No. 7,329,307, U.S. Pat. No. 7,326,280, and U.S. Pat. No. 5,964,221, each of which is incorporated herein by reference in its entirety.

The adsorbent cartridge includes adsorbent surfaces that are arranged in multiple layers. Generally, the surfaces are mechanically spaced (e.g., by ribs or other spacers, screens, etc.) where the spacers are in contact with the next adjacent sheet. In some embodiments, the spacers are parallel to the direction of air flow. In some embodiments, the sheets may be flat, or pleated, or contain ribs therein.

Figure 1B:
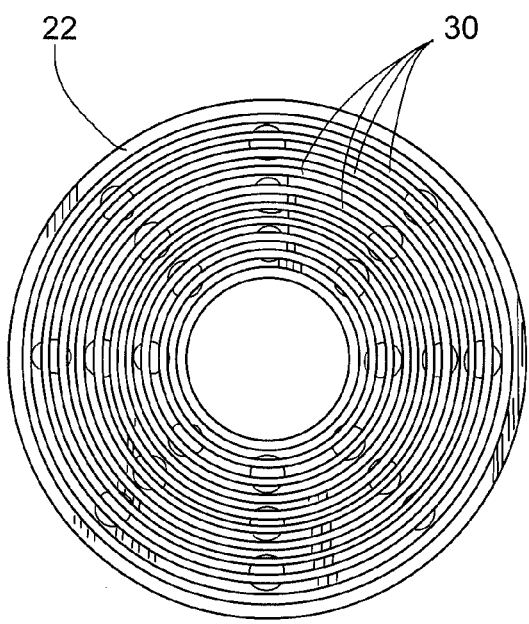
Figure 1C:
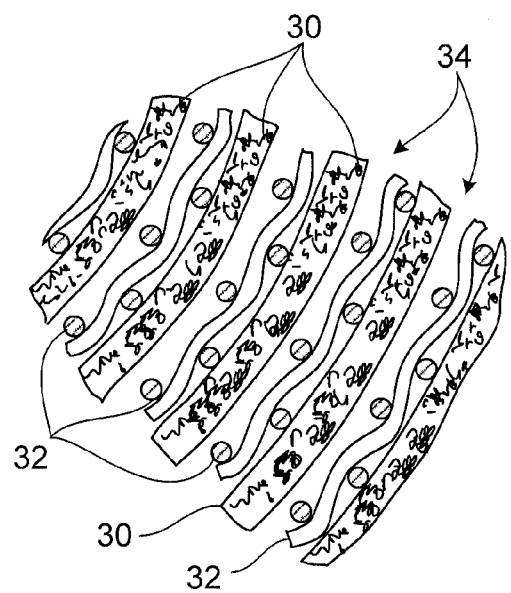

In some embodiments, the sheets are wound into a cylinder but the cartridge may also be of other geometries. In the wound embodiments, the sheet 30 is spiraled (i.e., arranged in a continuous helix or as separate rings or helixes arranged concentrically) as shown as illustrated in FIG. 1(a). Air flow through the cartridge can be from both directions (top to bottom, or bottom to top) and is parallel to the spiraled adsorbent sheet surfaces. FIG. 1(b) shows a top view of cylindrical cartridge 20 of FIG. 1(a) with adsorbent sheet 30 arranged in a "spiral" configuration where the sheet is wrapped around the center. FIG. 1(c) shows separating screens 32 positioned between the spirally positioned sheets 30.

In some embodiments, the sheets are stacked into a cube or rectangular shape (90 degree corners on all sides but length, width and depth may or may not be identical). In some embodiments, the adsorbent surfaces are planar. The term "planar" used to describe surfaces means that the adsorbent surfaces are substantially without curvature (e.g., the surfaces are not rolled). A sealing material (foam or rigid) may be used to seal two or more sides of the cube or rectangle, leaving two open end faces (to allow for air flow), two outer surfaces formed by the adsorbent sheets, and two foam surfaces.

In some embodiments, each adsorbent surface comprises the same type of adsorbent. In other embodiments, each adsorbent surface is independently selected from various adsorbents.

The Manufacture of Adsorbent Surfaces

In some embodiments, the gaseous contaminant is carbon dioxide. In some embodiments, the adsorbent material used in the adsorbent surfaces is calcium hydroxide or lithium hydroxide.

Further description of LiOH adsorbent sheets can be found in, for example, Hrycak et al. in U.S. Pat. No. 7,329,307 and U.S. Pat. No. 7,326,280, each of which is incorporated herein by reference in its entirety. Further description of $Ca(OH)_2$ adsorbent sheets and other types of adsorbent sheets can be found in, for example, in McKenna, U.S. Pat. No. 5,964,221, which is incorporated herein by reference in its entirety.

In one embodiment shown in FIG. 1(d), sheet 30 is formed of an adsorbent filled expanded porous PTFE sheet having a microstructure of nodes 40 interconnected with fibrils 41 wherein adsorbent material 39 is present in the voids of the PTFE structure as taught by U.S. Pat. No. 4,985,296 issued to Mortimer, Jr., incorporated herein by reference in its entirety. This sheet is water repellent, but air-permeable. Ideally, particles 39 are packed in a multi-modal (e.g., bi-modal or tri-modal) manner, with particles of different sizes interspersed around one another to fill as much of the available void space between particles as is possible so as to maximize the amount of active material contained in the sheet. This technique also allows more than one type of adsorbent particle to be filled into a single sheet.

By using filled porous expanded polytetrafluoroethylene (PTFE) as sheet 30, a number of additional advantages are further imparted. Expanded PTFE is a non-linting, non-outgassing inert material that effectively reduces dusting of adsorbent material during manufacturing and during the life of the filter. Additionally, processing advantages of this material include the ability to make a relatively thin material that can be produced in a wide sheet and then cut (or cut and pleated) into desired configurations.

The properties of $CO_2$ adsorbent filled PTFE sheet are such that no other supporting fabric or material is needed to maintain structural integrity. In fact, not only can this filled PTFE sheet withstand flexing, pleating and mechanical vibration under dry conditions, the hydrophobicity of the PTFE offers this structural durability even while subjected to direct liquid water contact. Another embodiment of sheet 30 is shown in FIG. 1(e), where filled PTFE sheet 30 is encapsulated between two hydrophobic gas-permeable membranes 42. These outer membranes 42 add extra protection to ensure that adsorption material 40 is contained within sheet 30 while preventing water from reaching the adsorbent contained in the sheet. Membranes 42 must have a high degree of filtration efficiency to prevent adsorbent particles from escaping into the breathing atmosphere. These membranes 42 preferably comprise porous expanded polytetrafluoroethylene (PTFE), because it is hydrophobic and offers high particulate filtration efficiency.

A third embodiment of the sheet is shown in cut-away FIG. 1(f) where an internal screen 43 is encapsulated by adsorbent material 39 that is surrounded by two hydrophobic gas-permeable membranes 42.

A fourth embodiment of the sheet 30 is shown in FIG. 1(g) where an internal screen 44 is attached to two hydrophobic gas-permeable membranes 42 and adsorbent material 39 is positioned in the voids between screen members 44.

Figure 1J:
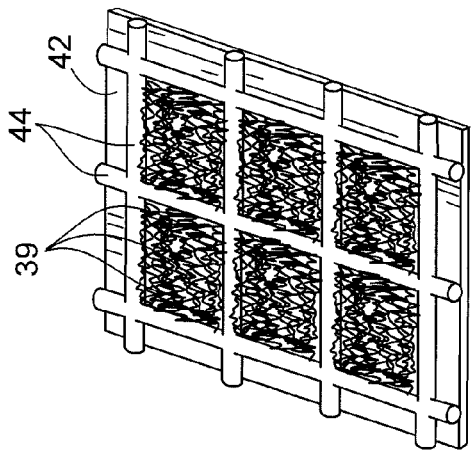
Figure 1I:
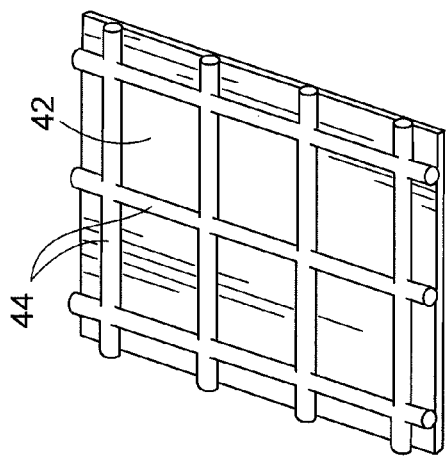
Figure 1H:
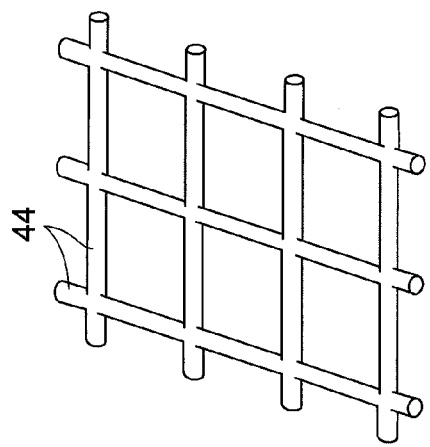
Figure 1K:
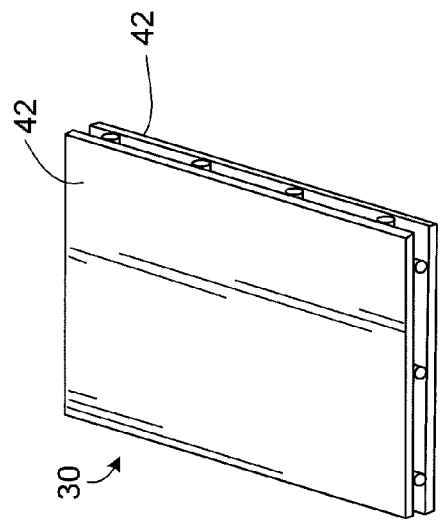

FIGS. 1(h) thorough 1(k) illustrate a method for making sheet 30 of FIG. 1(g) having an internal screen 44, adsorbent material 39, and outer membranes 42. FIG. 1(h) depicts internal screen 44. Next, in FIG. 1(i), internal screen 44 is attached to a membrane 42 by a lamination process. Subsequently, in FIG. 1(j), adsorbent material 39 is added into the open cells of internal screen 44. Afterwards, in FIG. 1(k), a second membrane 42 is laminated to the top of the internal screen 44, thereby encapsulating adsorbent material 40 within.

Figure 1L:
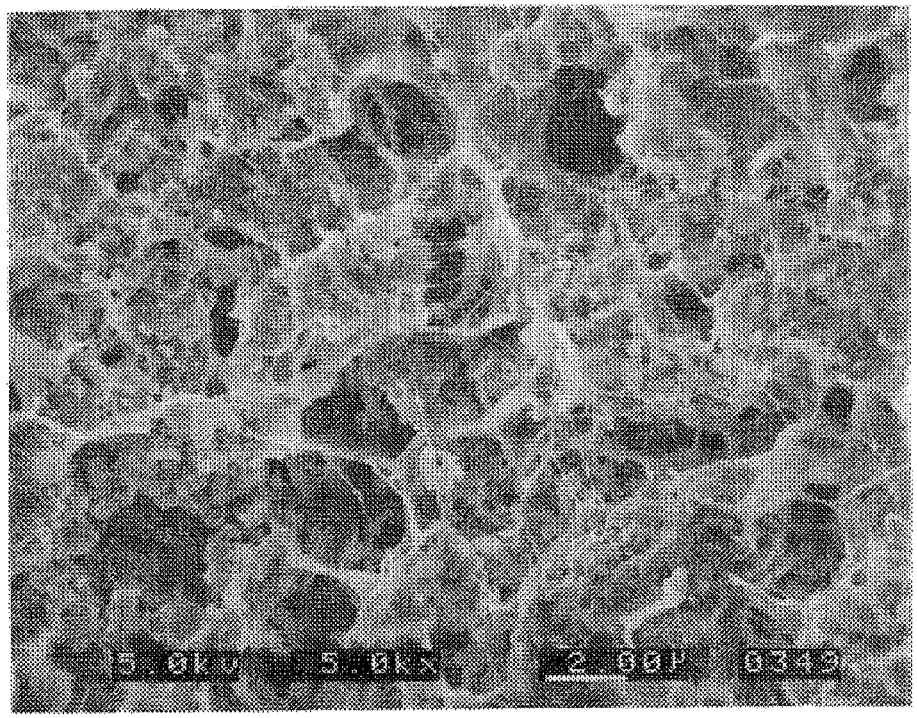

FIG. 1(l) is a scanning electron micrograph of another embodiment of sheet 30 used in the cartridges described herein. This structure is produced by way of thermally induced phase separation, such as in the following manner.

A water repellent polymer, such as ultra high molecular weight polyethylene, is combined with a gas adsorbent material, such as calcium hydroxide powder. This combination may be accomplished by combining the two materials together in an extruder. By conveying this mixture through the extruder and mixing with a lubricant, such as mineral oil, the polymer dissolves in the lubricant and become uniformly mixed with the adsorbent and lubricant. This mixture can then be extruded into a composite sheet or other shape.

The composite sheet may be calendared to further flatten the sheet if desired. The lubricant may then be extracted out of the resulting sheet using a solvent, such as hexane. The solvent may then be removed, such as through use of a dry nitrogen purge.

The resulting structure is highly micro-porous, allowing for the diffusion of $CO_2$ or other gases, and yet is able to be produced with very high adsorbent powder loadings per unit volume. Additionally, if a very strong polymer, such as Ultra High Molecular Weight Polyethylene is used, a very small amount of polymer is required to make the sheet structurally stable, which allows for even higher adsorbent loadings per unit volume. While typical powder loadings for this type of manufacturing process are on the order of 50 to 60% filler powder after process oil extraction, loadings well above 60% may be possible. In some embodiments, adsorbent loading is greater or equal to about 90% by weight. In some embodiments, adsorbent loading is greater or equal to about 97%. Additionally, in some embodiments, the material is molded into any desired shape, and thus, the separating means may be accomplished by molding separating ribs onto the surface of the sheet.

Various embodiments of this molded structure are illustrated in FIGS. 1(m) through 1(q). By molding the separating elements 33 (or "ribs") directly out of adsorbent material, not only is the adsorbent cartridge easier to produce, but, because of its self-separating properties, the total amount of adsorbent in the filter can be increased by 10 to 30 percent.

End Cap

The use of a uniform end cap to which an adsorbent cartridge can seal, helps to overcome problems associated with 1) air by-pass due to physical gaps between the cartridge and the housing canister, 2) damage due to caustic reaction between the cartridge and the inner walls of the housing canister, and 3) mechanical fragility of unprotected cartridges. An example of an adsorbent suitable for medical applications is the Eclipse™ $CO_2$ Adsorbent, which includes end caps.

Figure 1M:
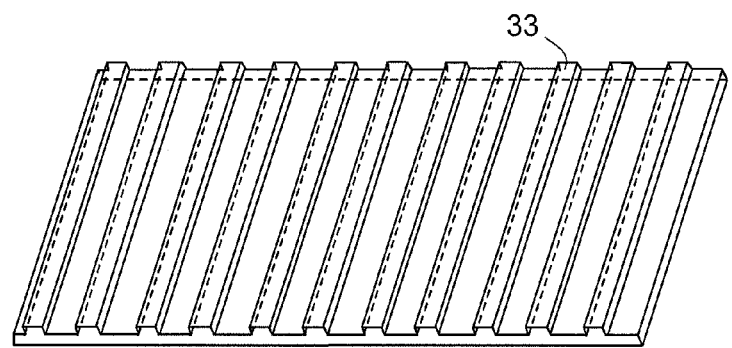
Figure 1N:
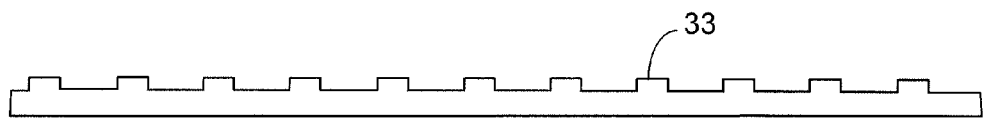
Figure 1O:
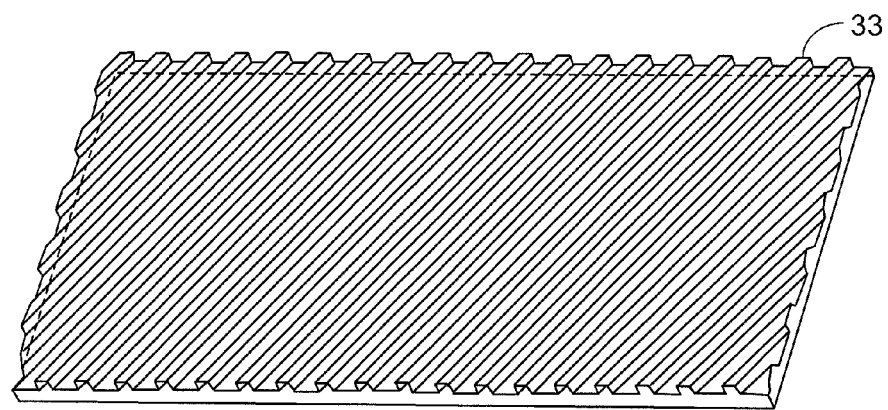
Figure 1P:
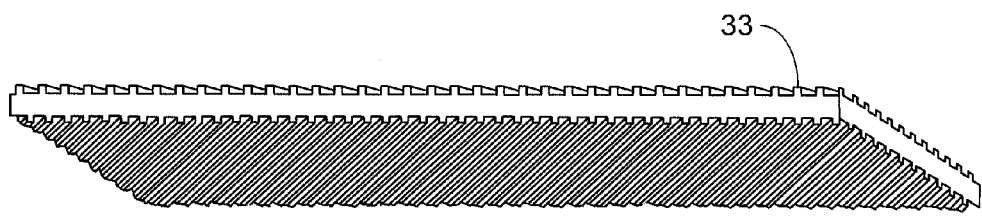
Figure 1Q:
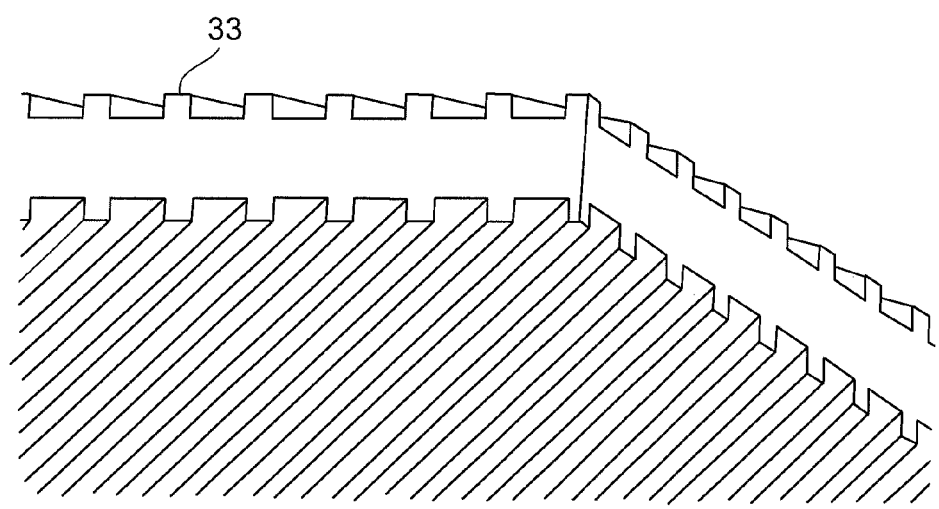

FIGS. 2(a) and 2(b) show embodiments of an assembled cartridge 100, a wound adsorbent cartridge 101 with foam 102 either covering the end of the cartridge or wound partially under the last wrap of adsorbent materials. The actual size and position of foam 102 can be tailored to specific applications. Foam 102 aids in preventing airflow from by-passing the cartridge. An end cap 103 can then be attached on one or more open end faces of the cartridge. Surfaces of the adsorbent materials are arranged in multiple layers 116 in cartridge 101. First open end face 104 is parallel to second open end face 115, both end faces are at opposite ends of the cartridge. Besides the two open end faces, cartridge 101 also includes an outer portion 121. Multiple layers 116 are arranged orthogonally with respect to both open end faces. Multiple layers 116 are mechanically spaced from one another such that gas flow between the layers is not obstructed. In some embodiments, the mechanical spacing is provided by ribs 33 as shown in FIG. 1(m). End cap 103 includes an outer sleeve 107, which forms a protruding portion 117 when end cap 103 is secured around open end face 104 of cartridge 101. Protruding portion 117 also includes an inner surface 118, these features are more clearly illustrated in FIG. 3(b). In some embodiments, end cap 103 contains supporting members in the form of radial ribs 109 that support an inner hub 108 through which a core plug 106 can be engaged. Wound cartridge 101 has an inner core 105 into which core plug 106 can be inserted. Core plug 106 can be incorporated both as an integrated core plug and end cap assembly 120 or it may be part of an assembly formed in a unitary fashion.

Plastic, rubber and co-molded materials (e.g. plastic/rubber) can be used to fabricate end caps. Material choices are determined based on the intended applications of the end caps and are not limited to the materials listed above. The actual manufacturing method used to produce the end cap can also vary. Manufacturing based on molded parts may be suitable for certain embodiments and applications. The adopted manufacturing method is based on the applications and constraints imposed by the choice of material.

End cap 103 can be partially or completely formed from flexible materials that are able to seal elastically to cartridges, even cartridges with variability in their diameters. Sealing can be done independently of the cartridge diameter by inserting core plug 106 on end cap 103 into inner core 105 of wound cartridge 101. In general, end cap 103 is designed to be placed onto one end of cartridge such that the end cap makes a snug fit to the outer rim or perimeter of the cartridge. In this manner, the foam materials surrounding the cartridge can also be secured. Correct positioning of the end cap can be ensured through the contact of radial ribs 109 with open end face 104 of the cartridge or through a fitting notch incorporated in the end cap profile. Ribs 109 can also ensure protection against telescoping of cartridge material.

A polymer (e.g. plastic) film 110 can be applied to seal assembly 100 around the outer surface of the cartridge, including the perimeter surfaces of the end caps, as shown in FIG. 2(b). For certain applications, polymer film 110 can be heat sealed to the assembly. In some embodiments, polymer film 110 extends over the outer edges of each end cap when the assembly is wrapped. In some embodiments, end cap 103 has a groove 520 (shown in FIG. 6(b) around the outer perimeter along the rim of end cap 103 to facilitate in securing film 110. Sealing materials do not fully encase end caps so that airflow through open end faces 104 and 115 of cartridge is not obstructed.

Besides its use in sealing the outer surface of the cartridges, polymer film 110 also enables a cartridge to attach to an end cap such that the cartridges with variability in diameter can be accommodated within the cross-sectional surface of the end cap.

Figure 3A:
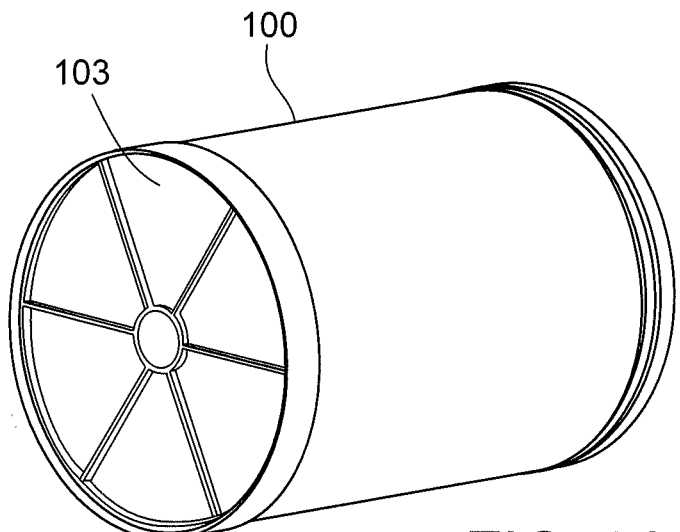
FIG. 3(*a*) shows an embodiment of the adsorbent cartridge assembly with a cap.
Figure 3B:
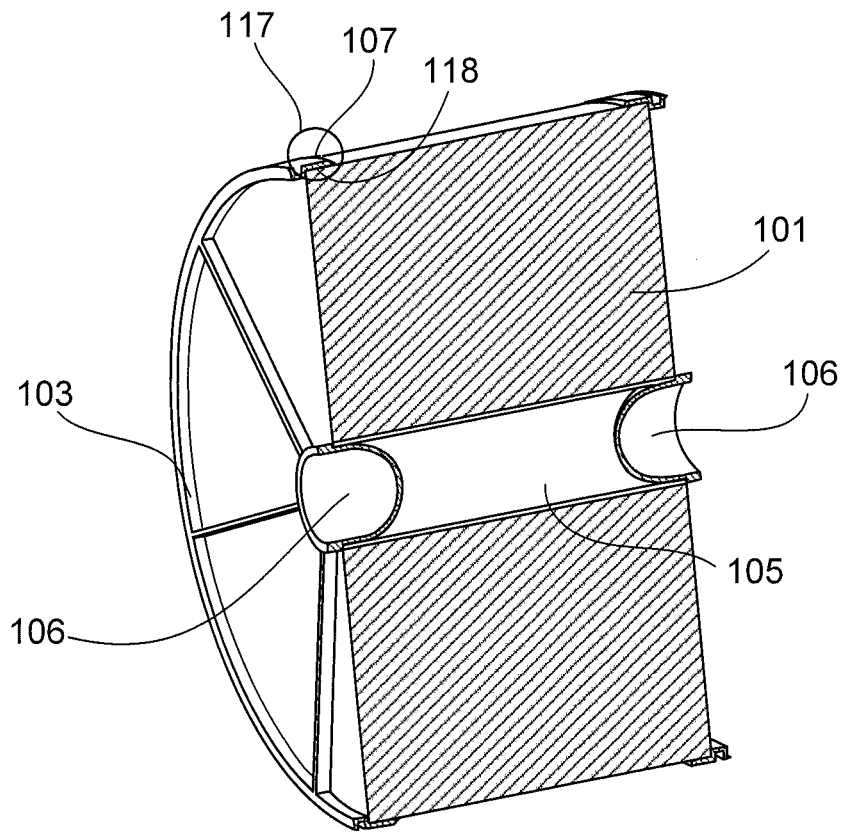
Figure 14:
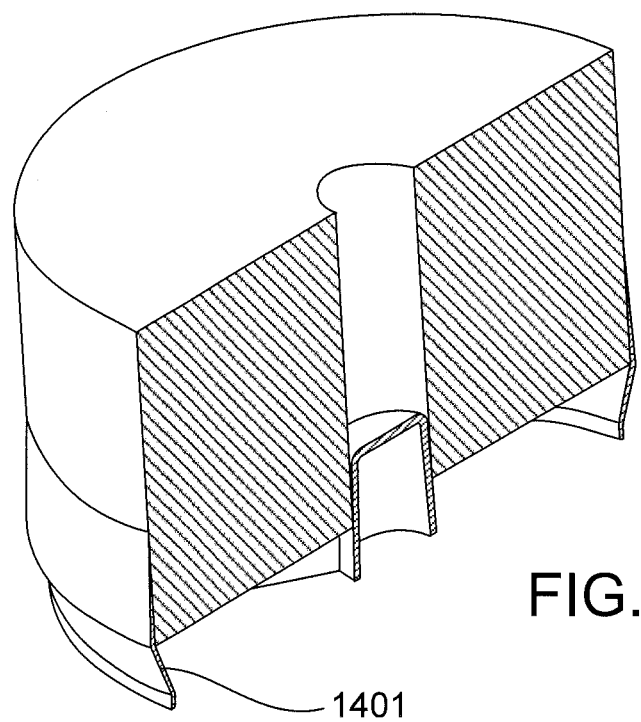
FIG. 14 shows two embodiments of end caps having different geometry allowing for different methods of grip on the cartridge which may eliminate the need for an outer wrap to secure the end cap to the cartridge.

In some applications as shown in FIGS. 3(a) and 3(b), gas flow through inner core 105 of cartridge 101 can be eliminated by the insertion of core plug 106 into the ends of inner core 105 after the cartridge and end caps are assembled. Besides eliminating gas flow, core plug 106 may also assists in securing the end caps. Based on the application, one or both end caps can be designed to have a core plug that is either integrated into the end cap or formed in a unitary fashion. Further as shown in FIG. 14, the design of the end cap may allow for instances where the outer wrap is not required. For example, the protruding portion of the end cap may taper (1401) and thereby eliminate the need for a groove within end cap design. The length of the end cap can be tailored to adjust the grip of the end cap to the cartridge. In addition, the outside ring can be angled in, or shaped in multiple ways to increase the grip on the cartridge, to thus eliminate the need for an outer shrink wrap.

Figure 16:
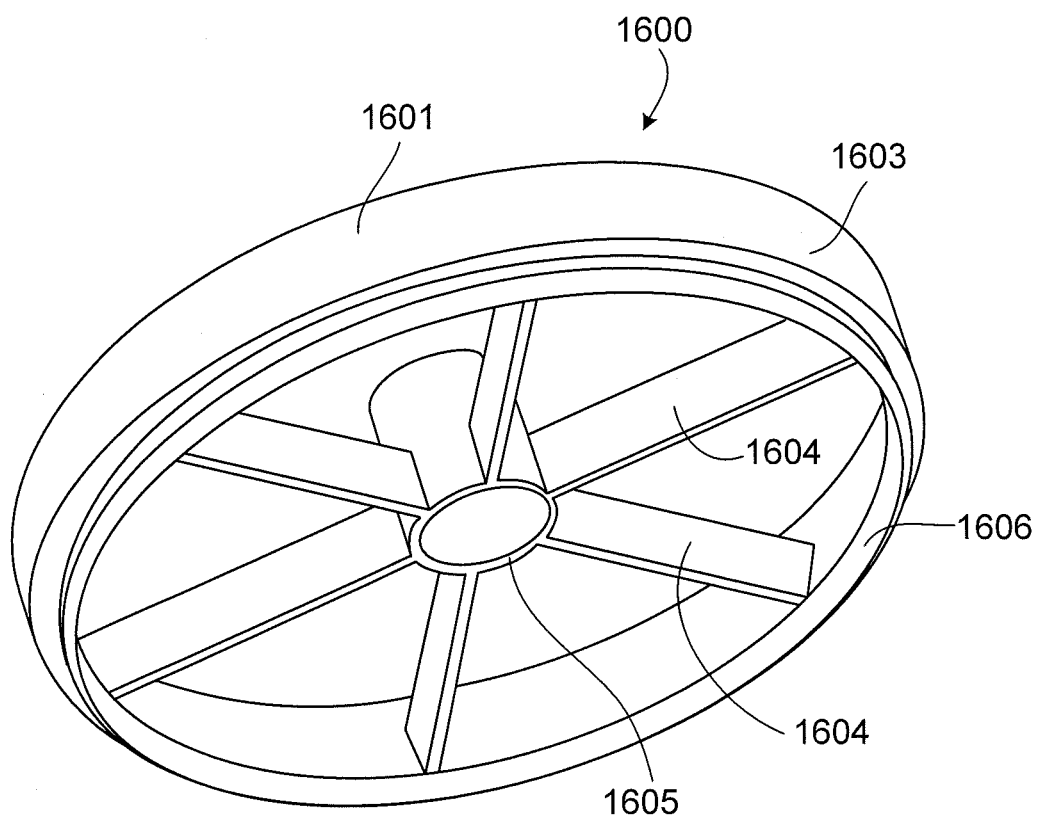
FIG. 16 shows a co-molded end cap with a sealing ring.

In some applications as shown in FIG. 16, an end cap 1600 can be co-molded, in which a body 1601 of the end cap 1600 is fabricated from one material and a seal section 1602 is made of another material. The body 1601 may include an outer sleeve 1603, radial ribs 1604 and an inner hub 1605. The sealing section 1602 may be disposed at one side of an inner surface 1606 of the outer sleeve 1603 and surrounds the entire circumference of the one side of the inner surface 1606. The sealing section 602 may protrude from outer sleeve 1603. In some applications, high density polyethylene (HDPE) may be used for the body 1061 of the end cap 1600 and a thermoplastic rubber (e.g., a crosslinked mixture of polypropylene and EPDM (ethylene-propylene-diene monomer) rubber, such as Santoprene™) for the seal section 1602 of the end cap 1600. Other combinations of materials for the body 1601 sealing section 1602 may be used, depending on the desired application.

Flow Cones

FIG. 2(c) shows a flow cone 111 with a tapered end 112 through which pre-treated and treated gas can be directed into or out of the flow cone respectively. In some embodiments, the combination of flow cone 111 with end cap 103 can be used to connect breathing devices that have a smaller standard tubing connection. Wider end 113 of flow cone 111 can be fitted onto (e.g. snapped on) end cap 103 to form assembly 114 shown in FIG. 2(c). In some embodiments, the flow cone and end cap assembly can be designed in an integrated fashion. The extended radial ribs in the end cap can help to direct gas flow to open end face 104 of the cartridge. Sealing is required between the end cap, the flow cone and the canister housing to eliminate gas flow that by-passes the cartridge.

Figure 6A:
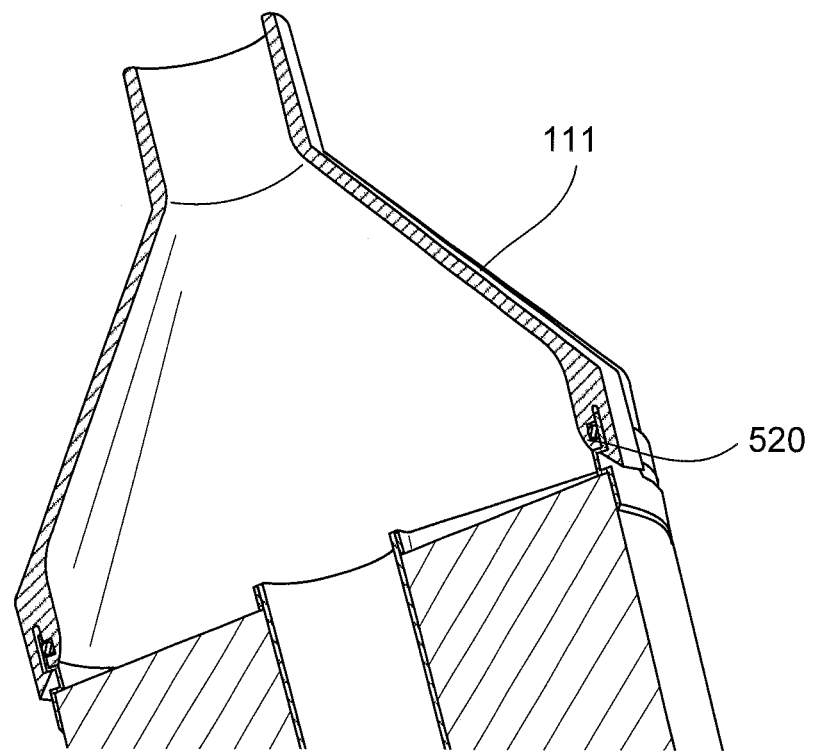
FIG. 6(*a*) shows an adsorbent cartridge assembly with an end cap that further includes a flow cone.
Figure 6B:
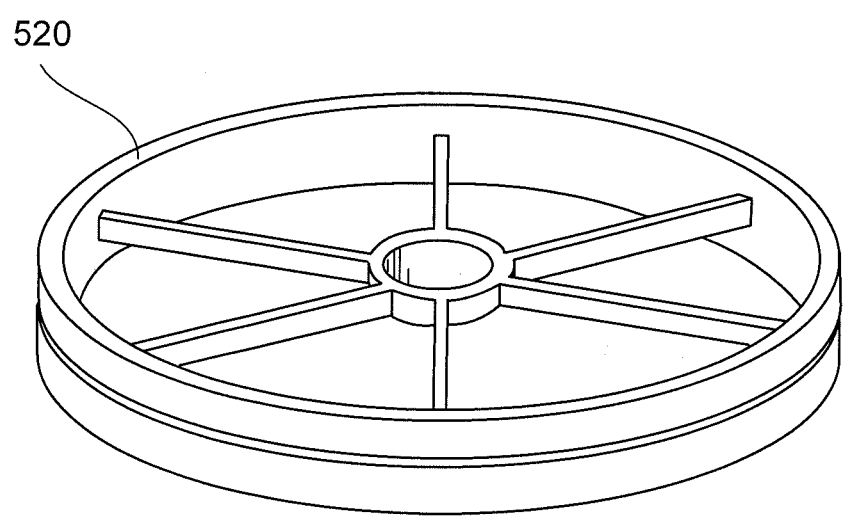

A groove 520 (in FIG. 6(b)) on the outer perimeter along the rim of end cap 103 allows a sealing film to be attached to the end cap. FIG. 6(a) shows an example in which groove 520 can be used to allow the latching of a flow cone 111 to the cartridge assembly. In some embodiments, this combination of flow cone 111 with end cap 103 can be used in cases where a housing canister body is not required. Such applications may include adsorbent systems that are designed for one time use.

Figure 4A:
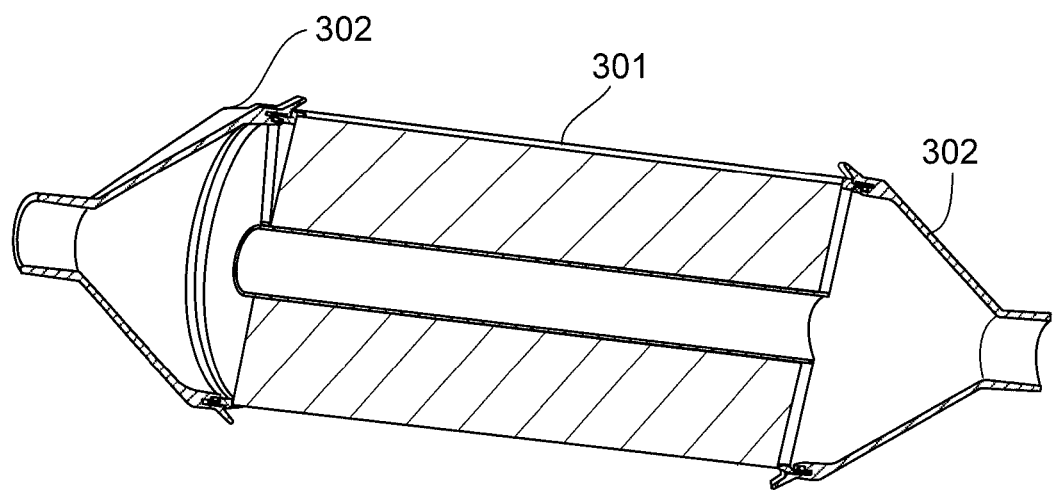
FIG. 4(*a*) shows an embodiment of the cartridge assembly using two flow cones which are snapped on to the end caps of the cartridge. A thin film shrink wraps around the cartridge and end caps to secure the whole assembly.
Figure 4B:
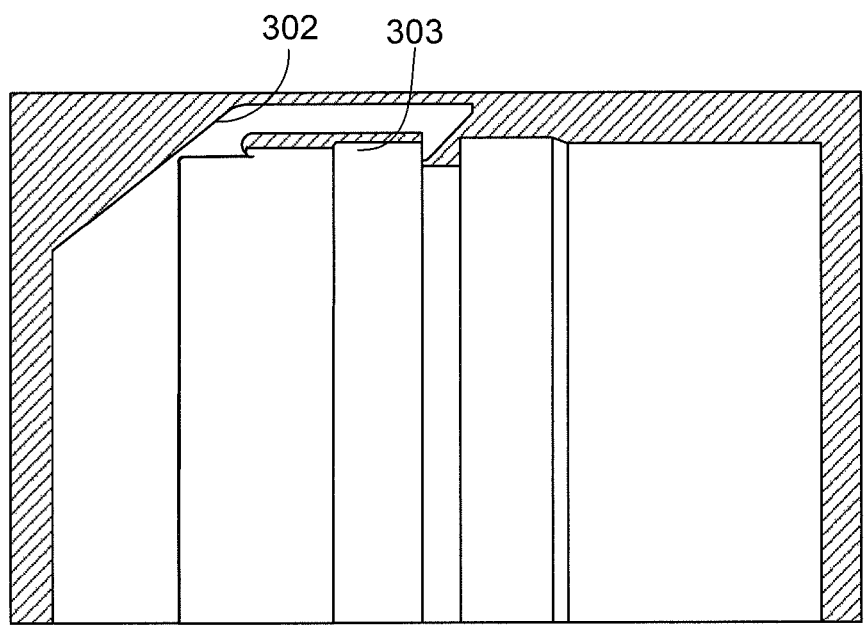

One example in which a canister housing is not required is the REMO2® application, an embodiment of which is shown in FIG. 4(a). In these applications, the cartridge may not be perfectly sealed. Instead, a film 301 is wrapped around the cartridge to help keep the tension in the wound cartridge and prevent gas entering from the sides of the cartridge. Two flow cones 302 are attached to open end faces of cartridge 101. The structural requirements for the housing element in such applications may be less stringent than those required in a typical canister. FIG. 4(b) shows the attachment mechanism of flow cone 302 to end cap 303.

Figure 10:
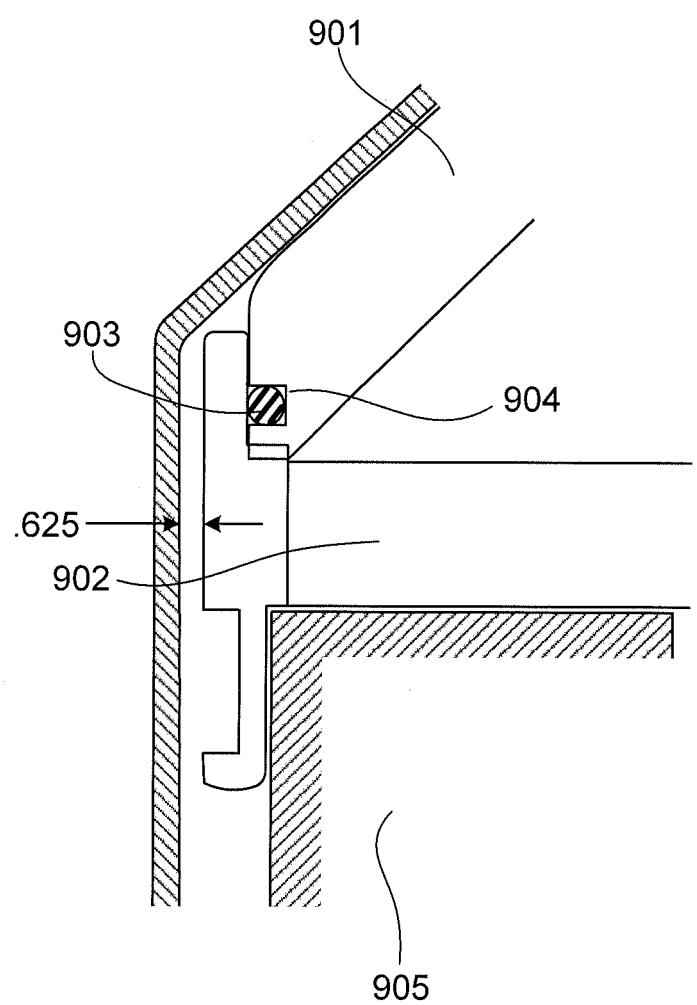
FIG. 10 shows an embodiment whereby the flow cone 901 is sealed to the end cap 902 by O-ring 903. Noting the flow cone is sealed to the canister body in another location.
Figure 11:
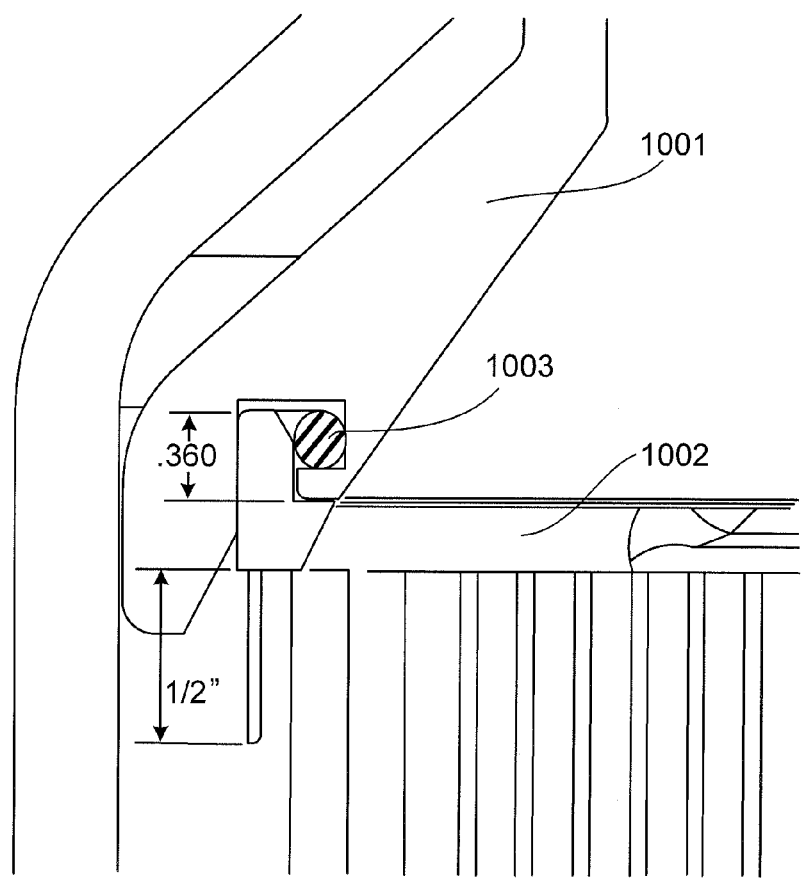

The design of the flow cone can be tailored to specific applications. In some embodiments, as shown in FIG. 10, flow cone 901 can be inserted to fit the inner diameter of the end cap 902. A single O-ring 903 fits into notch 904 and is used to provide mechanical sealing to ensure air flow through the cartridge (and eliminating by-pass of the cartridge). In embodiments, in which only a single O-ring is used, the end cap can be slipped more easily onto the O-ring.

Gas Flow Optimization

The embodiments described in this document can be modified in several ways to optimize gas flow through the adsorbent cartridge. In some embodiments, flow deflector plates can be inserted into end cap 103 to ensure a good and even gas flow across the entire open end face 104 of the cartridge. In some embodiments, a screen (which can affect the flow rate and flow distribution) can be placed near the top of the end cap to deflect the gas flow and average the flow across the whole face of the cartridge. In some embodiments, the extended radial ribs may be sloped instead of being arranged in a horizontal plane. These contoured ribs may help to deflect the gas flow and even out the distribution of gas flow across the cartridge. In some embodiments, a flat disc is inserted in a portion of the end cap assembly to evenly distribute gas flow by moving the gas stream to cover entire bounds of the cartridge.

Sealing Options Using O-Rings

Figure 9:
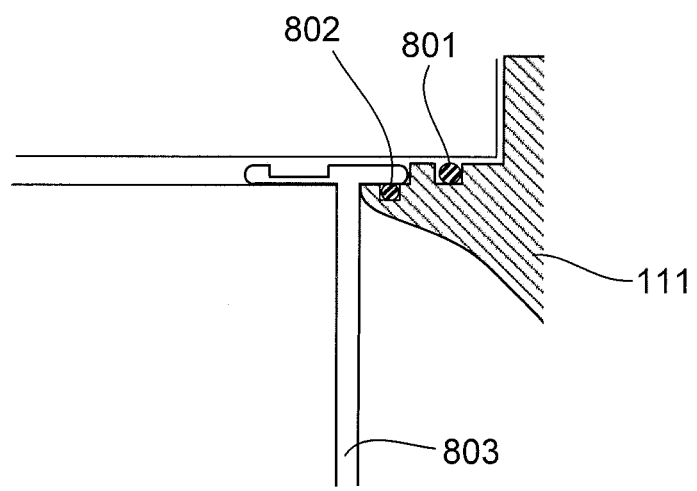
FIG. 9 shows an embodiment whereby the canister body is sealed to the flow cone 111 by O-ring 801, and the flow cone 111 is sealed to the end cap 803 by O-ring 802.

In some embodiments, as shown from a cross-sectional view in FIG. 9, two O-rings are used as sealants to seal an assembly featuring a cartridge, end cap, and flow cone installed in a housing canister. In these embodiments, flow cone 111 is latched onto an end cap 803. A sealant O-ring 801 is used to seal and prevent the airflow from going around the cartridge such that by-pass of airflow can be minimized or eliminated. A second sealant O-ring 802 seals the end cap and the flow cone to ensure that all airflow going through the flow cone passes through into the cartridge.

In some embodiments, the canister housing might already have sealing capabilities, thus sealing may not be required at some or all perimeter surfaces between the flow cone and the end cap, and between the end cap and the cartridge. In some embodiments, O-rings are used to form seals between mating surfaces defined as the surfaces between the cartridge and the top end of the lower end cap, and the surface between the cartridge and the lower end of the upper end cap. The necessity and use of seals for these surfaces are application specific.

In some embodiments, end caps may be attached to cartridges by means of adhesives (e.g. glues) that are inert to both the adsorbent materials and the gas flowing through the cartridge. The adhesives may be applied around the rim of a cartridge so that an end cap can be attached to the cartridge while not obstructing the flow of gas across open end face 104 of the cartridge.

Figure 5A:
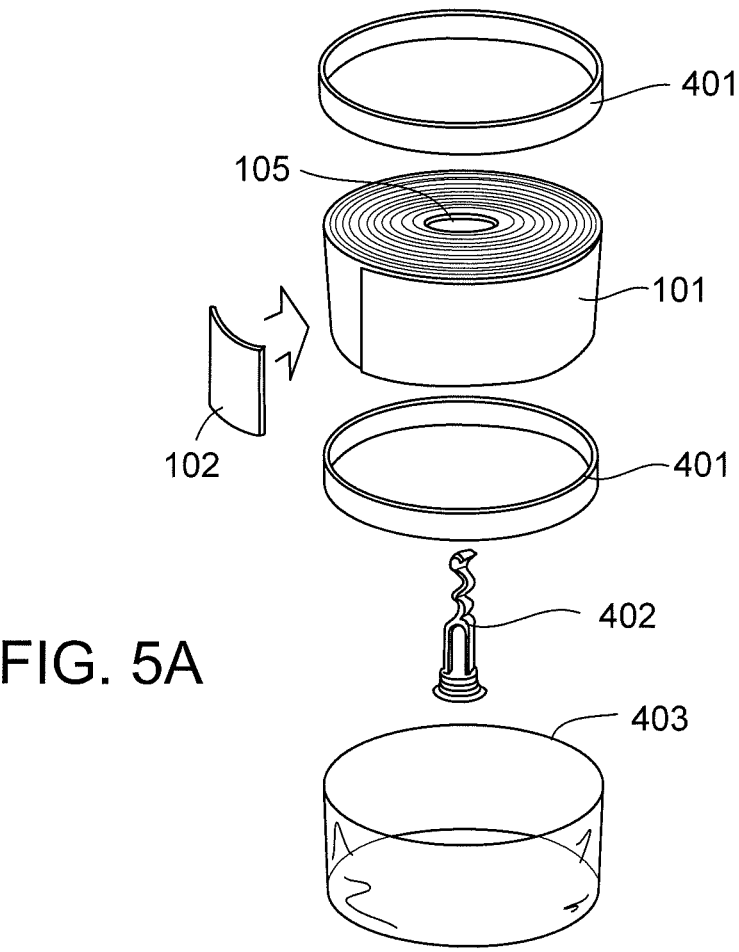
FIG. 5(*a*) shows another embodiment of the cartridge assembly with an end cap.
Figure 5B:
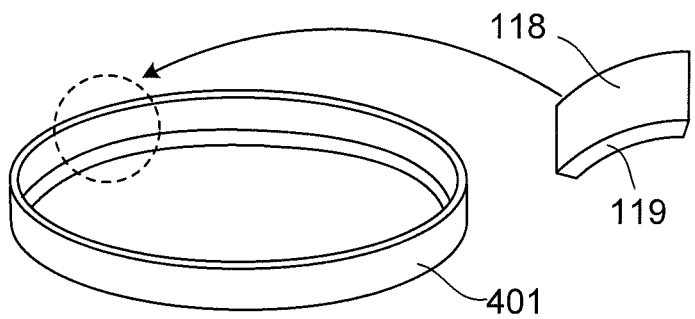

Different configurations of adsorbent systems require the use of adsorbent cartridges having different sizes. These differently sized cartridges in turn require end caps of different dimensions and configurations. In some embodiments, as shown in FIG. 5(a), end cap 401 does not have extended radial ribs. Instead of having radial ribs as supporting members, end cap 401 has a ledge 119 around inner surface 118 of protruding portion 117, as shown in FIG. 5(b).

In this configuration, a shrink wrap 403 made from, for example, polypropylene, polyolefin and polyethylene can be used to secure cartridge 101 and ends caps 401 around the rims and outer surface of the cartridge and end caps. Plug 402 with a loop can be engaged directly into inner core 105 of cartridge 101, which can be used as a means to pull the cartridge from the canister assembly.

Mechanical/Structural Protection of Cartridges

The integrated cartridge and end cap assembly is more robust against handling and shipping damages due to the shock absorbing capability and mechanical resistance afforded by the end caps. End caps may be fabricated from flexible materials or combinations of rigid and flexible materials that are able to absorb shocks. Since cartridges are often packaged in multiples with the cartridges arranged side by side, the ability to absorb shocks and vibrations along a vertical dimension across which at least one end cap is secured is useful in reducing damages on the cartridges incurred during shipment, without requiring the use of more expensive packaging materials. With the additional protection provided by the end caps, simple packaging techniques involving only standard metal foil composites bags placed inside a standard box could be utilized for shipping purposes. In addition, the end-user of the cartridges most commonly imparts vertical shocks and vibrations to the cartridge by subjecting the cartridges to vertical drops when the cartridges are installed in a canister. End caps thus help to ensure the integrity of cartridges both during shipment and installation of the cartridge by providing additional mechanical resistance against shocks to the adsorbent cartridges.

Figure 12:
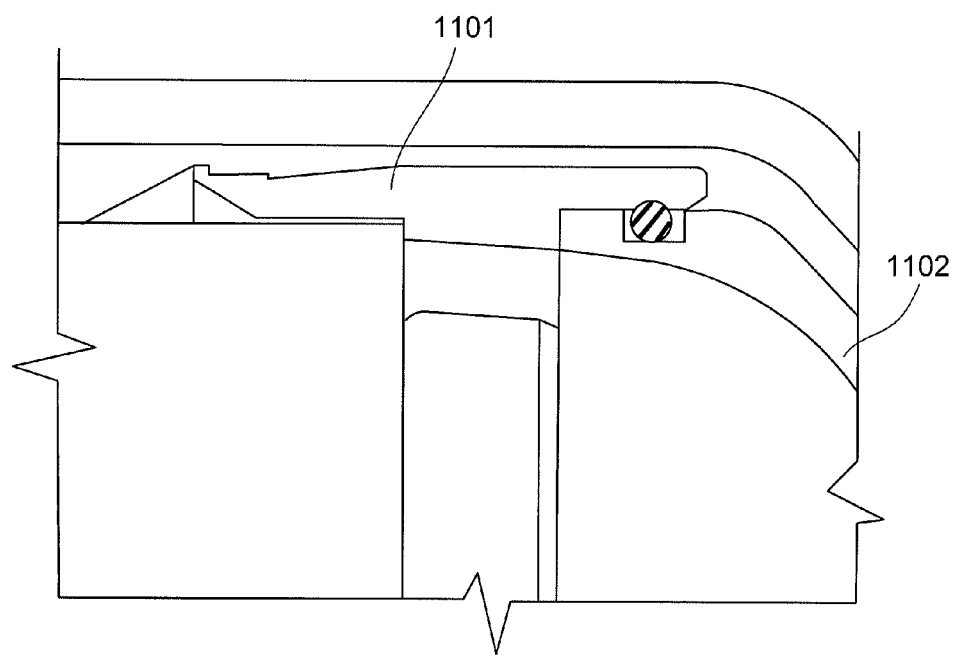

In some embodiments, end caps can be designed to have a thicker section for the rim and/or rib portions. Such a design would be more symmetric, which is more impact resistant and provides greater mechanical stability for the cartridge assembly. FIG. 12 illustrates an example of an end cap 1101 with thicker rim portion, which is engaged to a flow cone 1102.

Although end caps are generally used for wound cartridges, they can be used as means to reduce shipping and handling damages to non-cylindrical cartridges (e.g. square, rectangular, or oval) as well.

Inlet and Outlet of Airflow from the Same Face of a Cartridge

Figure 7:
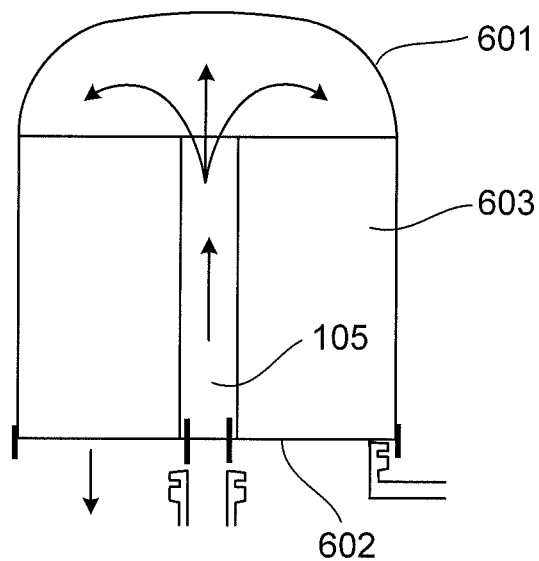
FIG. 7 shows an embodiment in which air flow is directed to exit a cartridge assembly through the same open end face from which the air flow entered, by the use of a dome shaped end cap.

In some embodiments, particularly those in which the available physical space for the adsorbent system is limited, gas flow may be required to enter and exit the adsorbent cartridge from the same end face. An example of such an embodiment is illustrated in FIG. 7. End cap 601 is domed-shaped and sealed on one end. Gas flows into the cartridge through core 105 of the cartridge. End cap 601 redirects the incoming gas in the reverse direction through the adsorbent cartridge such that the processed gas exits the same open end face 602 of the cartridge as the inflow of gas. End cap 601 is sealed to cartridge 603. End cap 601 may contain additional features and components such as gas deflector plates, flow discs and filters to help channel and make the gas flow through the cartridge more uniform. In some embodiments, the gas flow is in the reverse direction, depending on the application.

In the embodiments shown in FIG. 2, cartridge 101 has one inner core 105. In some embodiments, the cartridge may have more than one core. The additional cores can serve as channels through which gas may flow.

Figure 8:
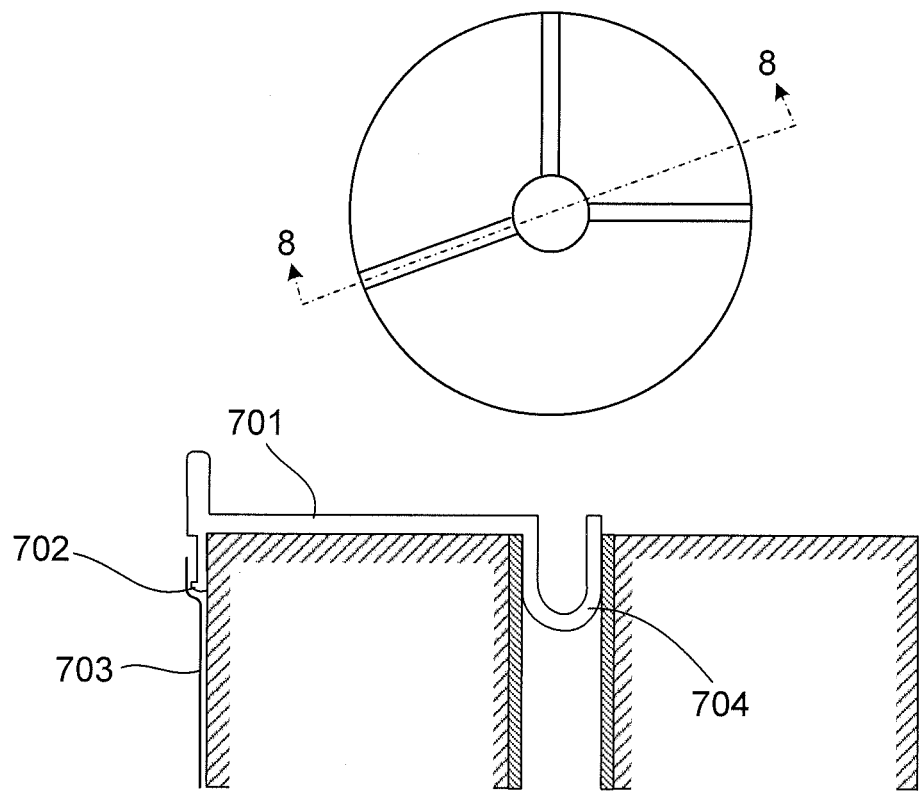
FIG. 8 shows a cross-section of an embodiment of the assembly as a cross-section, whereby an end cap being held by shrink wrap in addition to various sizes using different number of ribs (spokes) and inclusive of an integral core plug.

FIG. 8 shows both a top view and a cross sectional view of the adsorbent cartridge and endcap 701 with 3 spokes, the number of spokes will vary based on specific application and dimensions. The core plug 704 of the end cap is first used to engage the end cap to the cartridge before wrapping film 703 is secured to the cartridge and end cap together. Wrapping film 703 shrinks to the outside perimeter of the cartridge and the stepped face 702 provided on the end cap 701, in some applications the end cap many have a tapered face to facilitate the attachment of the wrapping film.

In the embodiments shown in FIG. 13, end cap 1201 with a symmetric design is shown. Such a symmetric design of the end cap allows ambidextrous installation of the end-cap and cartridge assembly, at the same time allowing a simpler mold design that may be advantageous in the manufacturing/production of these end caps.

In some embodiments, multiple cartridges are stacked. Each of the multiple cartridges can have its own housing canisters, or the different cartridges can be joined by end cap 103 having two opposing core plugs 106 as illustrated in FIG. 2(d) to connect the ends of different cartridges. An exemplary application of these embodiments can be for an application in which airflow or other gases is first passed through a cartridge containing molecular sieves to remove its moisture content before the processed gas enters another cartridge arranged in series to have carbon dioxide removed from it. Even though cartridges can be used to treat gas flow entering the open end faces in both directions, when symmetric end caps suitable for ambidextrous installation are used, safety features need to be in place to ensure that once installed, the direction of airflow is clearly indicated. For example, cylindrical/circular cartridges are typically installed into tapered canister housing in which the direction of airflow can be easily identified.

Example 1

Cartridge Assembly

Figure 15:
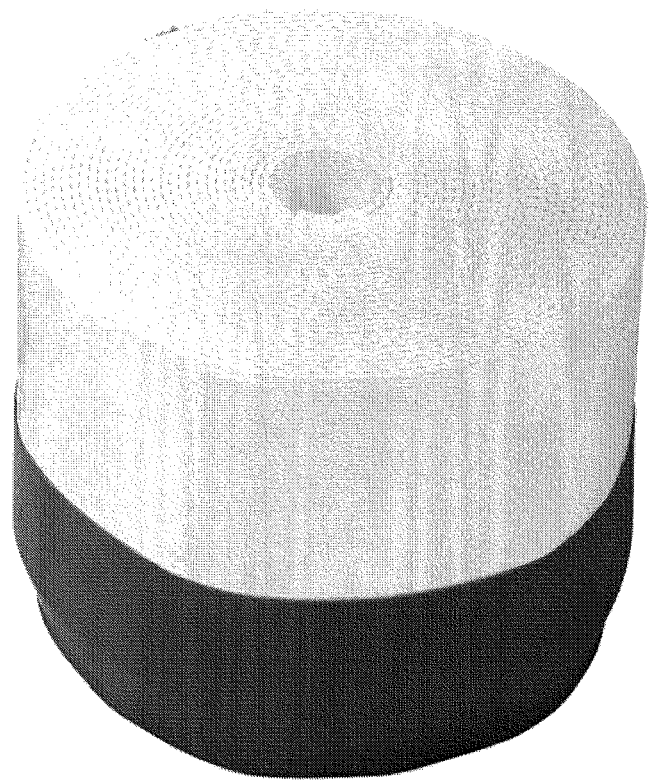
FIG. 15 shows an embodiment of a cartridge assembly.

The prototype cartridge assembly consists of a spirally wound cartridge and a single end cap, both of which are cylindrical although as previously noted a wound cartridge will not be perfectly cylindrical due to the step from the outer edge of the adsorbent sheet. The end cap in the prototype is designed and manufactured with a number of spokes and an integral plug. When attaching the end cap to the cartridge the integral plug slides into the central hollow core of the cartridge, which secures the end cap to the cartridge and also stops any flow of gas through the hollow core when installed (e.g., in a breathing device). The end cap, attaches to the cartridge around its perimeter. The endcap is made of a rubber material and is designed to be of a smaller diameter than the cartridge, so that when installed the end cap fits around the cartridge perimeter snugly. With this design, it has not been necessary to have an outer shrink wrap to hold the end-cap when assembled. The chosen durometer of the prototype is 80 which allows for some elasticity of the end cap to help when attaching to the cartridge. The rubber end cap also allows for a means to seal the cartridge assembly in the canister and thus minimizes by-pass of the adsorbent material. In some embodiments, the cartridge assembly is substantially as shown in FIG. 15.

A number of embodiments of the invention have been described. Nevertheless, it will be understood that various modifications may be made without departing from the spirit and scope of the invention. Accordingly, other embodiments are within the scope of the following claims.

What is claimed is:

1. An integrated, self-supporting adsorbent cartridge assembly for removing carbon dioxide contaminant, comprising:
    (a) an adsorbent cartridge, comprising an adsorbent sheet wound into a roll, wherein the adsorbent sheet is formed from a mixture comprising a polymer and an adsorbent, wherein the sheet is spaced to form multiple layers by ribs protruding from the sheet and molded directly out of the adsorbent sheet, wherein said sheet wound into a roll comprises a first open end face, a second open end face, and an outer portion; wherein:
    the adsorbent comprises calcium hydroxide or lithium hydroxide;
    the adsorbent cartridge does not comprise a rigid outer housing;
    the open end faces are at opposite ends of the cartridge;
    said layers are disposed orthogonally with respect to the open end faces; and
    said layers are mechanically spaced so as to allow gas flow between said layers;
    and
    (b) an end cap secured around said first open end face, wherein said end cap allows gas flow through said first open end face, comprising:
    an outer sleeve circumscribing the outer portion of one end of the cartridge adjacent to said first open face; wherein said outer sleeve has a portion protruding beyond said one end of the cartridge; and the protruding portion comprises an inner surface;
    wherein the assembly has mechanical integrity during transportation and installation.

2. The assembly of claim 1, wherein said outer sleeve further comprises one or more supporting members extending from the inner surface of the protruding portion of the outer sleeve and protruding at least partially over the first open end face.

3. The assembly of claim 2, wherein the one or more supporting members is a single member circumscribing the inner surface of the protruding portion of the outer sleeve.

4. The assembly of claim 2, wherein:
    the end cap further comprises an inner hub aligned over the center of said first open end face; and
    the one or more supporting members comprise a plurality of radial ribs connecting the inner hub to the inner surface of the protruding portion of the outer sleeve.

5. The assembly of claim 4, wherein said plurality of radial ribs are arranged substantially equidistant from each other.

6. The assembly of claim 4, wherein the inner hub is a disc.

7. The assembly of claim 4, wherein the inner hub is a ring.

8. The assembly of claim 1, wherein the roll has an inner core, parallel to gas flow and perpendicular to the open end faces; wherein said inner core is coaxial to the outer portion of the roll.

9. The assembly of claim 8, wherein the inner core is solid.

10. The assembly of claim 8, wherein the inner core is hollow.

11. The assembly of claim 8, wherein:
    the end cap further comprises a hub centered over the inner core; and
    the outer sleeve further comprises one or more supporting members extending from the inner surface of the protruding portion of the outer sleeve and protruding at least partially over the first open end face where the one or more supporting members comprise a plurality of radial ribs connecting the inner hub to the inner surface of the protruding portion of the outer sleeve.

12. The assembly of claim 11, wherein:
    the hub comprises a ring arranged concentrically to the outer sleeve; and
    the one or more supporting members comprise a plurality of radial ribs connecting the inner ring to the inner surface of the protruding portion of the outer sleeve.

13. The assembly of claim 12, wherein the assembly further comprises a plug inserted into the ring.

14. The assembly of claim 12, further comprising core plugs inserted into the ring in opposing directions so as to connect more than one cartridge in series.

15. The assembly of claim 11, wherein:
    the hub comprises a disc arranged concentrically to the outer sleeve; and
    the one or more supporting members comprise a plurality of radial ribs connecting the inner ring to the inner surface of the protruding portion of the outer sleeve.

16. The assembly of claim 11, wherein:
    the inner core is hollow;
    the inner hub comprises an inner sleeve inserted into the inner core; and
    the one or more supporting members comprise a plurality of radial ribs connecting the inner sleeve to the inner surface of the protruding portion of the outer sleeve.

17. The assembly of claim 11, wherein:
    the inner core is hollow;
    the inner hub comprises a plug inserted into the inner core; and
    the one or more supporting members comprise a plurality of radial ribs connecting the plug to the inner surface of the protruding portion of the outer sleeve.

18. The assembly of claim 11, wherein the hub has substantially the same dimension as the inner core of the roll.

19. The assembly of claim 1, wherein the cartridge further comprises a foam or sealing material covering at least a portion of an outer layer of the roll.

20. The assembly of claim 1, wherein the cartridge further comprises a foam or sealing material inserted under an outer layer of the roll.

21. The assembly of claim 1, wherein the end cap is secured to said first open end face by any method chosen from the group of: ultrasonic welding, shrink-wrapping, adhesives, and molding.

22. The assembly of claim 1, wherein the end cap is secured to the first open end face by a shrink wrap covering the outer portion of the cartridge and at least a portion of the outer sleeve.

23. The assembly of claim 1, wherein the outer sleeve tapers in the direction of the protruding portion allowing the end cap to be secured to the cartridge without any external securer.

24. The assembly of claim 1, wherein the outer sleeve further comprises a groove circumscribing the outer portion of the outer sleeve.

25. The assembly of claim 24, wherein the end cap is secured to said first open end face by a shrink wrap covering the outer portion of said cartridge and extending into the groove.

26. The assembly of claim 1, further comprising a cone secured around the outer sleeve, wherein said cone comprises an opening with a smaller diameter than the first open end face.

27. The assembly of claim 26, wherein the outer sleeve further comprises a groove circumscribing the inner surface of the protruding portion of the outer sleeve; and the cone further comprises a protrusion on an outer surface of the cone, which locks into the groove.

28. The assembly of claim 26, further comprising a sealant disposed between the cone and the inner surface of the protruding portion of the outer sleeve.

29. The assembly of claim 28, wherein the sealant is an o-ring.

30. The assembly of claim 8, wherein the inner core is hollow; and wherein said assembly further comprises a dome secured around the outer sleeve.

31. The assembly of claim 1, wherein the end cap is made from materials capable of absorbing shocks and/or contains flexible material suitable for making sealing attachment of the end cap to the cartridge.

32. The assembly of claim 1, wherein the cartridge has more than one axially extended channel within its interior through which gas can flow.

33. The assembly of claim 1, wherein the end cap further comprises means to promote a uniform flow of air across a cross-sectional surface of the cartridge.

34. The assembly of claim 33, wherein the said means is selected from the group of a flow deflector plate, a filter, a ring with sloping ribs and a disc.

35. The assembly of claim 1, wherein:
the roll has an inner core, parallel to gas flow and perpendicular to the open end faces, said inner core being coaxial to the outer portion of the roll;
the end cap further comprises an inner sleeve inserted into the inner core of the roll; and a plurality of radial ribs arranged substantially equidistant from each other connecting the inner sleeve to the inner surface of the protruding portion of the outer sleeve;
wherein the end cap further comprises a sealing ring co-molded to the inner surface of the protruding portion of the outer sleeve, the sealing ring surrounding the entire inner circumference of the outer sleeve, wherein the sealing ring is of a different material than the remainder of the end cap.

36. The assembly of claim 35, wherein said sealing ring comprises a thermoplastic rubber; and the remainder of the end cap comprises a high density polyethylene.

37. The assembly of claim 1, further comprising a second end cap secured around the second open end face, comprising:
an outer sleeve circumscribing the outer portion of an end of the cartridge adjacent to said second open face; wherein said outer sleeve has a portion protruding beyond the end of the cartridge adjacent to said second open face; and the protruding portion comprises an inner surface.

38. The assembly of claim 1, wherein the cartridge assembly is suitable for medical applications.

* * * * *